United States Patent
Hui et al.

(10) Patent No.: US 9,730,136 B2
(45) Date of Patent: Aug. 8, 2017

(54) DISTRIBUTED ROUTING IN WIRELESS NETWORKS

(71) Applicant: Telefonaktiebolaget L M Ericsson (publ), Stockholm (SE)

(72) Inventors: Dennis Hui, Sunnyvale, CA (US); Johan Axnäs, Solna (SE); Kumar Balachandran, Pleasanton, CA (US); Robert Baldemair, Solna (SE); Hugo Tullberg, Nyköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 300 days.

(21) Appl. No.: 14/554,455

(22) Filed: Nov. 26, 2014

(65) Prior Publication Data

US 2015/0146655 A1    May 28, 2015

Related U.S. Application Data

(60) Provisional application No. 61/909,267, filed on Nov. 26, 2013.

(51) Int. Cl.
*H04L 12/26* (2006.01)
*H04W 28/18* (2009.01)
(Continued)

(52) U.S. Cl.
CPC .............. *H04W 40/02* (2013.01); *H04L 45/12* (2013.01); *H04L 47/17* (2013.01)

(58) Field of Classification Search
CPC ......... H04W 40/02; H04L 45/12; H04L 47/17
(Continued)

(56) References Cited

U.S. PATENT DOCUMENTS 6,795,858 B1 *   9/2004   Jain ...................... H04L 67/1008
                                                                      709/226
2002/0142721 A1 * 10/2002 Souissi .................. H04L 45/04
                                                                       455/41.2
(Continued)

FOREIGN PATENT DOCUMENTS

WO        2014081364 A1      5/2014

OTHER PUBLICATIONS

Alkahtani, Abdullah M.S. et al., "Prioritised best effort routing with four quality of service metrics applying the concept of the analytic hierarchy process," Computers and Operations Research, vol. 33, Issue 3, Mar. 2006, Elsevier Science Ltd., pp. 559-580.

(Continued)

*Primary Examiner* — Alpus H Hsu
*Assistant Examiner* — Camquyen Thai
(74) *Attorney, Agent, or Firm* — Withrow & Terranova, PLLC

(57) ABSTRACT

Systems and methods related to distributed route determination through a multi-hop wireless network based on multiple route metrics or properties are disclosed. In some embodiments, a method of operation of a network node comprises identifying a subset of neighbors of the network node in a wireless network based on: (a) link weight(s) for links from the network node to at least some of the neighbors of the network node with respect to route metric(s) and (b) defined limit(s) for the route metric(s). The method further comprises obtaining second link weights for the links from the network node to at least the subset of the neighbors with respect to a second route metric, and identifying from the subset of the neighbors, an optimal next hop neighbor for the network node. In this manner, multiple route metrics are taken into consideration in manner that is computationally efficient.

22 Claims, 16 Drawing Sheets

(51) Int. Cl.
*H04W 40/02* (2009.01)
*G06F 15/177* (2006.01)
*H04L 12/721* (2013.01)
*H04L 12/801* (2013.01)

(58) Field of Classification Search
USPC .............. 370/230, 253, 254, 328, 252, 238; 709/226, 238, 244, 241; 455/41, 414, 455/445
See application file for complete search history.

(56) References Cited

U.S. PATENT DOCUMENTS

| | | | | |
|---|---|---|---|---|
| 2005/0286426 | A1* | 12/2005 | Padhye | H04L 45/00 370/238 |
| 2009/0116393 | A1 | 5/2009 | Hughes et al. | |
| 2009/0238093 | A1* | 9/2009 | Saneto | H04W 72/02 370/253 |
| 2009/0285124 | A1* | 11/2009 | Aguirre | H04L 45/122 370/255 |
| 2010/0172249 | A1* | 7/2010 | Liu | H04L 45/124 370/252 |
| 2010/0278102 | A1 | 11/2010 | Lee et al. | |
| 2011/0103473 | A1* | 5/2011 | Li | H04N 19/176 375/240.12 |
| 2011/0299422 | A1* | 12/2011 | Kim | H04W 48/16 370/253 |
| 2013/0163465 | A1* | 6/2013 | Krishnaswamy | H04L 47/2425 370/254 |
| 2014/0141788 | A1* | 5/2014 | Puthenpura | H04W 16/18 455/449 |
| 2014/0269278 | A1* | 9/2014 | Alexander | H04L 51/38 370/230 |

OTHER PUBLICATIONS

Author Unknown, "Bellman-Ford algorithm," Wikipedia, the free encyclopedia, last modified Sep. 14, 2014, retrieved Oct. 1, 2014 from http://en.wikipedia.org/wiki/Bellman%E2%80%93Ford_algorithm, 6 pages.
Author Unknown, "Dijkstra's algorithm," Wikipedia, the free encyclopedia, last modified Sep. 21, 2014, retrieved Oct. 1, 2014 from http://en.wikipedia.org/wiki/Bellman%E2%80%93Ford_algorithm, 11 pages.
Author Unknown, "Glossary of graph theory," Wikipedia, the free encyclopedia, last modified Aug. 30, 2014, retrieved Oct. 1, 2014 from http://en.wikipedia.org/wiki/Glossary_of_graph_theory, 15 pages.
Garey, Michael R. et al., "2.5: Polynomial Transformations and NP-Completeness," Computers and Interactability: A Guide to the Theory of NP-Completeness, New York: W.H. Freeman and Company, 1979, 7 pages.
Ma, Qingming et al., "Quality of Service Routing for Traffic with Performance Guarantees," Building QoS into Distributed Systems: IFIP TC6 WG6.1 Fifth International Workshop on Quality of Service (IWQOS '97), May 21-23, 1997, New York, NY, Springer US, pp. 115-126.
Ma, Qingming et al., "Routing Traffic with Quality-of-Service Guarantees in Integrated Service Networks," retrieved Oct. 1, 2014 from http://citeseerx.ist.psu.edu/viewdoc/download?doi=10.1.1.68.3469&rep=rep1&type=pdf, 15 pages.
Moreira, Waldir A. et al., "Using Multiple Metrics with the Optimized Link State Routing Protocol for Wireless Mesh Networks," 26th Brazilian Symposium on Computer Networks and Distributed Systems, May 26-30, 2008, Rio de Janeiro, Brazil, pp. 903-916.
Sobrinho, Joao Luis, "Network Routing with Path Vector Protocols: Theory and Applications," Proceedings of the 2003 Conference on Applications, Technologies, Architectures, and Protocols for Computer Communications (SIGCOMM '03), Aug. 25-29, 2003, Karlsruhe, Germany, ACM, pp. 49-60.
Wang, Zheng et al., "Quality-of-Service Routing for Supporting Multimedia Applications," IEEE Journal on Selected Areas in Communications, vol. 14, No. 7, Sep. 1996, IEEE, pp. 1228-1234.
Yiltas, Derya et al., "QoS-based multi-domain routing under multiple QoS metrics," IET Communications, vol. 5, Issue 3, Feb. 11, 2011, IET, pp. 327-336.
Yuan, Xin, "On the Extended Bellman-Ford Algorithm to Solve Two-Constrained Quality of Service Routing Problems," Proceedings of the 8th International Conference on Computer Communications and Networks, 1999, Boston, MA, IEEE, pp. 304-310.
Corson, M. Scott et al., "A distributed routing algorithm for mobile wireless networks," Wireless Networks, vol. 1, Issue 1, Feb. 1, 1995, Amsterdam, the Netherlands, J.C. Baltzer AG, Science Publishers, pp. 61-81.
Yang, Yaling et al., "Design Guidelines for Routing Metrics in Multihop Wireless Networks," IEEE INFOCOM, The 27th Conference on Computer Communications, Apr. 13-18, 2008, Phoenix, Arizona, IEEE, pp. 2288-2296.
International Search Report and Written Opinion for International Patent Application No. PCT/IB2014/066364, mailed Oct. 26, 2015, 16 pages.
International Preliminary Report on Patentability for International Patent Application No. PCT/IB2014/066364, mailed Mar. 30, 2016, 7 pages.

\* cited by examiner

DISTRIBUTED ROUTING IN WIRELESS NETWORKS

RELATED APPLICATIONS

This application claims the benefit of provisional patent application Ser. No. 61/909,267, filed Nov. 26, 2013, the disclosure of which is hereby incorporated herein by reference in its entirety.

FIELD OF THE DISCLOSURE

The present disclosure relates to routing in wireless networks and, in particular, to distributed routing in multi-hop wireless networks using more than one route metric.

BACKGROUND

Dense deployment of base stations or wireless access nodes may be used to address the exponential growth in wireless data traffic. The feasibility of a dense deployment of wireless access nodes is predicated on the existence of a backhaul network that can provide high data rate transport for each individual access node in the network. From the point of view of maximizing capacity, optical fiber based backhaul solutions are desirable and are suitable for new constructions. However, in existing buildings and infrastructure, the cost of installing new fibers to every access node in a very dense network can be prohibitive.

An alternative to the optical backhaul solution is the wireless self-backhaul solution, where the same access spectrum is used to provide transport. With self-backhauling, an access node serves not only its own assigned User Equipment (UE) in its vicinity but also its neighboring access nodes as a relaying node in order to route data towards and/or from an information aggregation node in the network. A group of self-backhauling access nodes can form a multi-hop mesh network. Access nodes cooperatively route each other's traffic to and from the aggregation node.

Finding an optimal (or close to optimal) route from a source node to a destination node in a multi-hop network often is formulated in terms of finding a route that maximizes or minimizes the value of a single route metric. The route metric may be, for example, route bit rate capacity, route power consumption, route latency, etc. If the route metric is simple enough—that is, if it is both monotonic and isotonic—there exist efficient polynomial-time algorithms for finding the optimal route, e.g., the Bellman-Ford algorithm and the Dijkstra algorithm. In the general case, however, the problem is Non-Deterministic Polynomial-Time hard (NP-hard), i.e., the computational complexity grows exponentially with the number of nodes.

Unfortunately, in practice, the desire to take multiple route properties into account in the route metric (e.g., both route bit rate and route latency) makes it difficult to formulate an appropriate route metric that is simple enough (i.e., is both monotonic and isotonic) to be used with existing polynomial-time algorithms (e.g., the Bellman-Ford algorithm and the Dijkstra algorithm) for finding the optimal route through a multi-hop wireless network. As such, finding optimal routes for a route metric that takes multiple route properties into account may be computationally unfeasible using known algorithms. As such, there is a need for systems and methods for finding an optimal, or close to optimal, route from a source node to a destination node in a multi-hop network when taking multiple route properties into consideration.

SUMMARY

Systems and methods related to distributed route determination through a multi-hop wireless network based on multiple route metrics or properties are disclosed. In some embodiments, a method of operation of a network node in a wireless network to provide distributed multi-hop route determination comprises identifying, by the network node, a subset of neighbors of the network node in the wireless network based on: (a) link weight(s) for links from the network node to at least some of the neighbors of the network node with respect to route metric(s) for a multi-hop route through the wireless network and (b) defined limit(s) for the route metric(s). In some embodiments, the subset of the neighbors of the network node are neighbors determined to satisfy the limit(s) on the route metric(s) based on the link weights with respect to the route metric(s). The method further comprises obtaining, by the network node, second link weights for the links from the network node to at least the subset of the neighbors with respect to a second route metric for a multi-hop route through the wireless network, and identifying, by the network node, from the subset of the neighbors, an optimal next hop neighbor for the network node in a multi-hop route through the wireless network based on the second link weights. In this manner, multiple route metrics are taken into consideration when identifying the optimal route from the source node to the destination node through the multi-hop wireless network in manner that is computationally efficient.

In some embodiments, identifying the subset of the neighbors of the network node comprises, based on the link weights for the links from the network node to at least some of the neighbors of the network node with respect to the route metric(s), removing the neighbor(s) of the network node that do not satisfy the defined limit(s) for the route metric(s) from a neighbor list of the network node to provide a trimmed neighbor list of the network node. This trimmed neighbor list is a list of neighbors for consideration with respect to the second route metric such that the neighbors in the trimmed neighbor list form the subset of the neighbors of the network node that are to be considered when identifying the optimal next hop neighbor based on the second route metric. Identifying the optimal next hop neighbor comprises identifying one of the subset of the neighbors of the network node in the trimmed neighbor list as the optimal next hop neighbor based on the second link weights.

In other embodiments, obtaining the second link weights comprises obtaining the second link weights for the links from the network node to the neighbors with respect to the second route metric. Identifying the optimal next hop neighbor for the network node then comprises penalizing the second link weights of the neighbors of the network node that are not in the subset of neighbors of the network node and, after penalizing the second link weights of the neighbors of the network node that are not in the subset of the neighbors of the network node, identifying one of the neighbors of the network node as the optimal next hop neighbor based on the second link weights.

In some embodiments, the route metric(s) consist of a first route metric ($\mu_A$) such that identifying the subset of the neighbors comprises obtaining, for each neighbor, a first link weight for the link from the network node to the neighbor with respect to the first route metric ($\mu_A$) and identifying the subset of the neighbors that satisfy a defined limit for the first route metric ($\mu_A$) based on the first link weights for the links from the network node to the neighbors of the network node.

In some embodiments, the method of operation of the network node further comprises identifying a second subset of the neighbors of the network node that satisfy a defined limit for the second route metric ($\mu_B$) based on the second link weights, and identifying, from the second subset of the neighbors, a second optimal next hop neighbor for the network node in a multi-hop route through the wireless network based on the first link weights for the links from the network node to at least the subset of the neighbors with respect to the first route metric ($\mu_A$).

In some embodiments, the second route metric ($\mu_B$) is an individual route metric. In some embodiments, a composite route metric of the first route metric ($\mu_A$) and the second route metric ($\mu_B$) is non-isotonic. In some embodiments, the first route metric ($\mu_A$) and the second route metric ($\mu_B$) are both monotonic and isotonic.

In some embodiments, identifying the optimal next hop neighbor for the network node comprises identifying one of the plurality of neighbors of the network node as the optimal next hop neighbor for the network node based on a composite route metric ($\mu_{composite}$) that is a function of the first route metric ($\mu_A$), the second route metric ($\mu_B$), and a penalty function that penalizes the second route metric ($\mu_B$) if the first route metric does not satisfy the defined limit on the first route metric ($\mu_A$). In some embodiments, the composite route metric ($\mu_{composite}$) is non-isotonic.

In some embodiments, the first route metric ($\mu_A$) is one of a maximum or minimum metric, and the second route metric ($\mu_B$) is an additive metric.

In some embodiments, the one or more route metrics comprise a first route metric ($\mu_A$) and an additional route metric such that identifying the subset of the neighbors comprises: (a) obtaining, for each neighbor of the network node, a first link weight for the link from the network node to the neighbor with respect to the first route metric ($\mu_A$); (b) identifying a first subset of the neighbors that satisfy a defined limit for the first route metric ($\mu_A$) based on the first link weights for the links from the network node to the neighbors of the network node; (c) obtaining, for each neighbor of the network node in at least the first subset of the neighbors, an additional link weight for the link from the network node to the neighbor with respect to the additional route metric; and (d) identifying, from the first subset of the neighbors, a second subset of the neighbors of the network node that satisfy a defined limit for the additional route metric based on the additional link weights for the links from the network node to at least the first subset of the neighbors of the network node.

In some embodiments, the method of operation of the network node further comprises receiving, by the network node, an updated limit for at least one of the one or more route metrics. The method of operation of the network node further comprises identifying a new subset of the neighbors of the network node based on the updated limit for the at least one of the one or more route metrics, and identifying, from the new subset of the neighbors of the network node, a new optimal next hop neighbor for the network node in a multi-hop route through the wireless network with respect to the second route metric.

In some embodiments, the method of operation of the network node further comprises receiving, by the network node, the one or more defined limits for the one or more route metrics. Further, in some embodiments, the method of operation of the network node comprises providing the one or more defined limits for the one or more route metrics to at least one of the neighbors of the network node in the wireless network. In other embodiments, the method of operation of the network node further comprises providing the one or more defined limits for the one or more route metrics to each of the neighbors of the network node in the wireless network.

Embodiments of a network node that operates to provide distributed route determination according to any of the processes disclosed herein are also disclosed.

Embodiments of a method of operation of a wireless network are also disclosed. In some embodiments, the method comprises: (a) finding, by the wireless network in a distributed manner, a route from a source node to a destination node through the wireless network according to a first route metric ($\mu_A$); (b) establishing, by a source node, a limit on the first route metric ($\mu_A$) for the route based on a weight assigned to the route from the source node to the destination node for the first route metric ($\mu_A$); (c) providing the limit on the first route metric ($\mu_A$) from the source node to at least some of a plurality of network nodes in the wireless network; (d) trimming, by each network node, links with neighbor nodes for which the limit on the first route metric ($\mu_A$) is not satisfied from consideration for an optimal route from the source node to the destination node according to a second route metric ($\mu_B$) to thereby provide a trimmed network; and (e) finding, by the wireless network in a distributed manner, an optimal route from the source node to the destination node through the trimmed network according to the second route metric ($\mu_B$).

In some embodiments, trimming the links with the neighbor nodes for which the limit on the first route metric ($\mu_A$) is not satisfied comprises removing the links with the neighbor nodes for which the limit on the first route metric ($\mu_A$) is not satisfied from consideration for the optimal route from the source node to the destination node according to the second route metric ($\mu_B$).

In some embodiments, trimming the links with the neighbor nodes for which the limit on the first route metric ($\mu_A$) is not satisfied comprises penalizing, with respect to the second route metric ($\mu_B$) the links with the neighbor nodes for which the limit on the first route metric ($\mu_A$) is not satisfied such that the links with the neighbor nodes for which the limit on the first route metric ($\mu_A$) is not satisfied are effectively removed from consideration for the optimal route from the source node to the destination node according to the second route metric ($\mu_B$).

In some embodiments, finding the route from the source node to the destination node through the wireless network according to the first route metric ($\mu_A$) comprises finding an optimal route from the source node to the destination node through the wireless network according to the first route metric ($\mu_A$).

In some embodiments, finding the route from the source node to the destination node through the wireless network according to the first route metric ($\mu_A$) comprises finding a route from the source node to the destination node through the wireless network having a weight for the first route metric ($\mu_A$) that is better than a predefined threshold.

In some embodiments, the method of operation of the wireless network further comprises determining whether a weight of the optimal route for the second route metric ($\mu_B$) is better than a predefined acceptable level. The method further comprises, if the weight of the optimal route for the second route metric ($\mu_B$) is not better than the predefined acceptable level: (a) establishing, by the source node, a new limit on the first route metric ($\mu_A$) for the route that is less restrictive than the limit on the first route metric ($\mu_A$); (b) providing the new limit on the first route metric ($\mu_A$) from the source node to at least some of the plurality of network nodes in the wireless network; (c) removing, by each network node in the plurality of network nodes, all links with neighbor nodes for which the new limit in the first route metric ($\mu_A$) is not satisfied from consideration for a new optimal route from the source node to the destination node according to the second route metric ($\mu_B$) to thereby provide a new trimmed network; and (d) finding, by the wireless network in a distributed manner, a new optimal route from the source node to the destination node through the new trimmed network according to the second route metric ($\mu_B$).

In some embodiments, the method of operation of the wireless network further comprises: (a) finding, by the wireless network in a distributed manner, a route from the source node to the destination node through the wireless network according to the second route metric ($\mu_B$); (b) establishing, by the source node, a limit on the second route metric ($\mu_B$) for the route based on a weight assigned to the route from the source node to the destination node for the second route metric ($\mu_B$); (c) providing the limit on the second route metric ($\mu_B$) from the source node to at least some of the plurality of network nodes in the wireless network; (d) removing, by each network node in the plurality of network nodes, all links with neighbor nodes for which the limit on the second route metric ($\mu_B$) is not satisfied from consideration for an optimal route from the source node to the destination node according to the first route metric ($\mu_A$) to thereby provide a second trimmed network; (e) finding, by the wireless network in a distributed manner, an optimal route from the source node to the destination node through the second trimmed network according to the first route metric ($\mu_A$); and (f) selecting one of the optimal route from the source node to the destination node through the trimmed network according to the second route metric ($\mu_B$) and the optimal route from the source node to the destination node through the second trimmed network according to the first route metric ($\mu_A$) as a best optimal route.

In some embodiments, the method of operation of the wireless network further comprises, prior to finding the optimal route from the source node to the destination node through the trimmed network according to the second route metric ($\mu_B$), further trimming the trimmed network based on one or more additional route metrics and one or more defined limits for the one or more additional route metrics.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
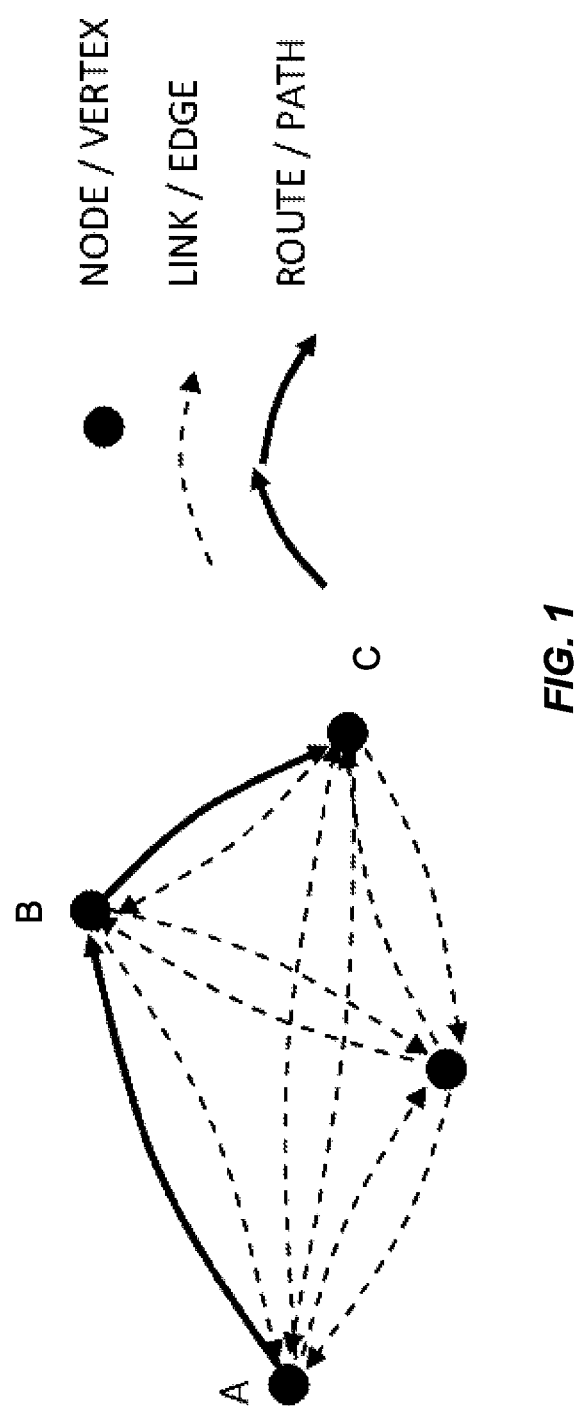
FIG. 1 illustrates a directed graph that represents a multi-hop wireless network that includes a number of network nodes represented as vertices in the directed graph and (potential) wireless links between the network nodes represented by edges between the vertices.

Systems and methods are disclosed for distributed routing through a multi-hop wireless network. Before describing these embodiments, a discussion of a multi-hop network and terminology that will be used throughout this disclosure is beneficial. FIG. 1 illustrates a directed graph that represents a multi-hop wireless network that includes a number of network nodes represented as vertices in the directed graph and (potential) wireless links between the network nodes represented by edges between the vertices. Specifically, the multi-hop network can be modelled as a directed graph $G \equiv (V,E)$, where V denotes the set of graph vertices, and E denotes the set of edges. Each network node is then represented by a graph vertex $v \in V$, and each (potential) wireless link between two network nodes is represented by an edge $e \in E$. A route from a source node (e.g., a mesh network egress point) to a destination node (e.g., a user terminal) can be represented by a path P in the wireless network, which is a sequence of vertices $\{v_i\}_{i=1}^{K}$ such that $v_i \in V$ for all i and $(v_i, v_{i+1}) \in E$ for all i=1, 2, ..., K−1, where K denotes the number of vertices on the path P, $v_1$ is the start vertex, and $v_K$ is the end vertex. In the example shown in FIG. 1, $v_1$ is vertex A and $v_K$ is vertex B. For any given path P, define E(P) as the set of all edges $\{(v_i, v_{i+1})\}_{i=1}^{K-1}$ formed by adjacent vertices on the path P. In FIG. 1, P={(A, B),(B, C)}. The term subpath may be used to refer to a contiguous set of edges along a given path. For example, in FIG. 1, {(A, B)} forms a subpath of P. For simplicity, vertices and edges will henceforth often (somewhat informally) be referred to as "nodes" (or "network nodes") and "links".

Routing through the wireless network is often performed by first defining a route metric μ. The route metric μ in principle assigns a weight $w_\mu(P)$ to each possible path or subpath (denoted together as (sub)path) P in the wireless network. In many cases, it is possible to express the (sub)path weight $w_\mu(P)$ as a function of individual link weights $w_\mu(l)$ for $l \in E(P)$. Additive metrics can be defined as the sum of individual link weights $w_\mu(l)$. For example, the latency $w_{latency}(P)$ of a path P is the sum of the latencies $w_{latency}(l)$ of the individual links:

$$w_{latency}(P) = \sum_{l \in E(P)} w_{latency}(l). \quad (1)$$

Minimum (or maximum) route metrics are the minimum (or maximum) of the individual link weights. For example, the bit rate $w_{bitrate}(P)$ of a path P is the minimum (bottleneck) bit rate $w_{latency}(l)$ of the links along the path P:

$$w_{bitrate}(P) = \min_{l \in E(P)} w_{bitrate}(l). \quad (2)$$

Depending on the metric type, the path weight should either be minimized or maximized. For example, the latency should be minimized, whereas the bit rate should be maximized. It is, however, convenient to consistently use metrics of one of the two types. This can be achieved by converting route metrics of the other type to the desired type. For example, instead of bit rate (which should be maximized), one may use the inverse of the bit rate (which should be minimized). We will henceforth assume that weights should always be minimized.

Once the route metric is defined, the route that optimizes the route metric should be found. If the route metric is monotonic and isotonic, there are efficient algorithms for finding the optimal route. As used herein, "monotonicity" means that if a path is extended by one more link at either end, the weight of this extended path is at least as large as the weight of the original path. Hence, given a monotonic route metric μ, if any path P is extended by one link $(v_K, v_{K+1})$, where $v_K$ denotes the end vertex of the path P, to form an extended path $P' = \{P, v_{K+1}\}$, then it holds that $w_\mu(P') \geq w_\mu(P)$.

Figure 2:
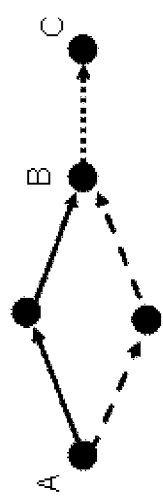
FIG. 2 is an illustration of the concept of isotonicity.
Figure 2:

As used herein, "isotonicity" means that the route metric preserves the ordering of the weights of two paths when they are extended by a common third link or set of links. Hence, given an isotonic route metric μ, if any two paths $P_1$ and $P_2$ that share the same source and destination vertices are extended by a common link $(v_K, v_{K+1})$, where $v_K$ is the end vertex of both $P_1$ and $P_2$, to form extended paths $P'_1 = \{P_1, v_{K+1}\}$ and $P'_2\{P_2, v_{K+1}\}$, then it holds that $w_\mu(P_1) \geq w_\mu(P_2)$ implies $w_\mu(P'_1) \geq w_\mu(P'_2)$ (and vice versa). FIG. 2 is an illustration of the concept of isotonicity. If the route metric is isotonic, then the ordering of the two paths from A to B (i.e., which of the solid and the dashed paths has the lowest metric) is guaranteed to be unaltered when the two paths are extended with an additional common link (B to C).

It may be noted that if the path weights can be expressed as a sum or maximum/minimum of independent and positive constituent link weights (i.e., weights that are independent of what other links are used), the route metric will automatically be monotonic and isotonic. However, in a wireless network with interference between links, the weights of existing links will typically change as more links are added to a path, and isotonicity will normally be broken.

Routing can either be centralized (i.e., one central node takes the routing decision) or distributed (i.e., network nodes may take routing decisions locally). Distributed routing can be either source-oriented (i.e., finding a route to reach the source node) or destination-oriented (i.e., finding a route to reach the destination node). Distributed routing generally includes the following main steps: (i) collecting relevant information at each network node about the quality of potential links with its neighbor nodes; (ii) selecting the next hop neighbor at each node based on the collected information in order to reach the source (or, respectively, the destination) with the best resulting route metric; and (iii) communicating information about which neighbor nodes of each network node are on the selected path (e.g., in case of source-oriented routing in order to reach the destination in the reverse direction). With distributed routing, it is not necessary for any network node in the network to have a global knowledge about the topology of the network or the final selected path/route. Every network node only needs to know the neighbor to which the network node is to forward packets. The embodiments described herein generally focus on step (ii) where the selection of the next hop neighbor at each network node is performed in a distributed fashion without the need of a centralized entity in the network. For simplicity of discussion, we assume destination-oriented routing in the following discussion, while noting that the embodiments disclosed herein apply equally well to source-oriented routing.

Systems and methods are disclosed herein to (i) provide a way to combine two (or possibly more) different route metrics into a sensible composite route metric and (ii) efficiently find a route that optimizes this metric in a distributed manner, even though, in some embodiments, the metric may be non-isotonic.

To simplify the presentation, an example embodiment for a special case of two individual metrics being bit rate and power consumption is first described. The more general case is described below.

The basic idea is to define, as an optimal route, a route that has as low as possible power consumption while still reaching at least a certain predefined fraction k (e.g., 95%) of the maximum possible bit rate that would be attainable if the power consumption were not considered. In other words, one primarily attempts to reach as high bit rate as possible, but is willing to sacrifice some of the bit rate (1-k, e.g., 5%)

in order to reduce power consumption. With such a composite route metric (precise composite route metric definition is provided below), the optimal route can be found in three steps.

In the first step, the (optimal or best) next hop node of each network node is found for the highest bit rate route without considering power consumption. The source node (or the destination node in source-oriented routing) also determines the corresponding highest bit rate achieved by the resulting optimal route for the highest bit rate. Since the bit rate metric is monotonic and isotonic, algorithms, such as Bellman-Ford, can be used to identify the (optimal or best) next hop node of each network node, and hence the corresponding optimal route in a distributed fashion. Let $R_{max}$ denote the maximum bit rate.

In the second step, the source node (or the destination node in source-oriented routing) floods the network with information about the maximum bit rate $R_{max}$, and possibly a predefined fraction k (which is information indicative of a predefined limit on the route metric, which in this case is the maximum bit rate $R_{max}$) to every network node, or at least some of the network nodes, in the network.

In the third step, each network node starts anew, this time first removing all links with neighboring nodes with maximum possible bit rate over the link below $kR_{max}$. The resulting trimmed network can easily be shown to still allow all routes with bottleneck bit rates larger than or equal to $kR_{max}$, but no other routes. In this trimmed network, the route with the lowest power consumption is then sought in a distributed manner based on the power consumption metric. Since the power consumption metric is isotonic, that route can be efficiently found using, for example, the Bellman-Ford algorithm.

On a high level, embodiments are disclosed for: (i) combining two (or possibly more) different link weights into a composite link weight, from which a composite route, or path, metric can be defined and (ii) computationally efficiently (in polynomial time) finding a route that optimizes this composite route metric in a distributed manner, even though the composite route metric may be non-isotonic.

In particular, let $w_{\mu_A}(l)$ and $w_{\mu_B}(l)$ be the weights of a link $l \in E$ in the network for two route metrics $\mu_A$ and $\mu_B$, respectively. In other words, the metrics of any path P are obtained by combining the corresponding weights of links $l \in E(P)$ over the path P. According to a preferred embodiment, the first route metric $\mu_A$ of a path P is a minimum metric or a maximum metric that combines the link weights according to:

$$w_{\mu_A}(P) = \min_{l \in E(P)} w_{\mu_A}(l) \quad (3)$$

or $$w_{\mu_A}(P) = \max_{l \in E(P)} w_{\mu_A}(l) \quad (4)$$

while the second route metric $\mu_B$ is an additive metric that combines the link weights according to:

$$w_{\mu_B}(P) = \sum_{l \in E(P)} w_{\mu_B}(l). \quad (5)$$

The method for combining two link weights is, in its most simple incarnation, as follows. The weight of a link $l \in E(P)$ of a composite route metric, $\mu_{composite}$, is defined by ascribing to each link $l \in E(P)$ a composite link weight $$w_{composite}(l) = w_{\mu_B}(l) + T(w_{\mu_A}(l) - C(s,d)) \quad (6)$$

where $C(s,d) = f'(\min_{P' \in P(s,d)} w_{\mu_A}(P'))$ is a threshold expressed via a predefined function $f'$, $T(\bullet)$ is a predefined penalty function, s is the source vertex of P, d is the destination vertex of P, and P(s,d) is the set of all paths from s to d in the network.

One example of the penalty function $T(\bullet)$ is the "infinite brick wall" function given by:

$$T(x) = \begin{cases} +\infty & \text{if } x > 0 \\ 0 & \text{otherwise} \end{cases} \quad (7)$$

For this penalty function, expressed in words, the resulting weight $w_{composite}(l)$ of a link according to the composite route metric $\mu_{composite}$ is:

$+\infty$ if the link weight $w_{\mu_A}(l)$ for the first route metric $\mu_A$ is above a certain threshold C(s,d), where the threshold C(s,d) is a predefined function $f'$ of the lowest route, or path, weight $w_{\mu_A}(P')$ of any path $P' \in P(s,d)$ from the source vertex to the destination vertex, otherwise the link weight $w_{\mu_B}(l)$ of the link for the second route metric $\mu_B$.

Other examples of the penalty function $T(\bullet)$ include an exponential function given by $T(x) = ae^{bx}$, for some constant $a>0$ and $b>0$, a sigmoid function such as $$T(x) = \frac{ax}{\sqrt{1+x^2}},$$

for some large constant $a>0$
or a linear function given by $T(x) = ax$, for some constant $a>0$.

These functions can be viewed as approximations of the "infinite brick wall" function in Equation (7) that can be used to impose soft penalty on links based on their link weights (according to the first route metric $\mu_A$) with respect to the threshold C(s,d). Using the infinite brick wall function (or an approximation thereof), in the composite link weight $w_{composite}(l)$ of Equation (6), the link metric $w_{\mu_B}(l)$ is penalized, according to the penalty function $T(\bullet)$, if the link weight $w_{\mu_A}(l)$ is not greater than the threshold C(s,d).

According to one preferred embodiment, the route, or path, metric of a given path P may be defined as an additive metric with respect to the composite link weight $w_{composite}(l)$ as follows:

$$w_{\mu_{composite}}(P) = \sum_{l \in E(P)} w_{\mu_{composite}}(l). \quad (8)$$

Such a composite route metric is guaranteed to be isotonic. It should be noted that the composite route metric $\mu_{composite}$ defined here is not only a function of the individual route metrics $\mu_A$ and $\mu_B$ for the path P (or the composite link weight $w_{composite}(l)$ according to the composite route metric $\mu_{composite}$ is not only a function of the individual link weights $w_{\mu_A}(l)$ and $w_{\mu_B}(l)$), but also considers information about other paths P' in the network in a specific way.

The formation of the composite route metric $\mu_{composite}$ can be generalized in several ways. Some generalizations will be implicitly defined from the following description of embodiments for finding the optimal route from two or more route metrics.

Note that one way to interpret such a composite route metric is to search for the optimal route(s) according to the first route metric $\mu_A$, trim the connection graph to keep only those network nodes that are good enough to be within a tolerance of the optimal metric with respect to the first route metric $\mu_A$, and then search for the optimal route(s) with respective to the second route metric $\mu_B$ on the trimmed connection graph. The resulting route(s) found in such a manner is/are guaranteed to perform well with respect to both the first and second route metrics $\mu_A$ and $\mu_B$, while both search steps involve only isotonic metrics and can therefore employ any existing, efficient distributed routing algorithm. Trimming the connection graph (which is also referred to herein as trimming the network or trimming the neighbor lists of the network nodes) may include updating a neighbor list of each (or at least some) network node by removing entries to neighboring nodes. In other embodiments, the neighbor lists are not actually trimmed; rather, the weights with respect to the second route metric $\mu_B$ of the links to neighbors that do not satisfy the tolerance of the optimal metric with respect to the first route metric $\mu_A$ are penalized to effectively remove those neighbors from consideration for the optimal route (i.e., to effectively trim the network).

Figure 3:
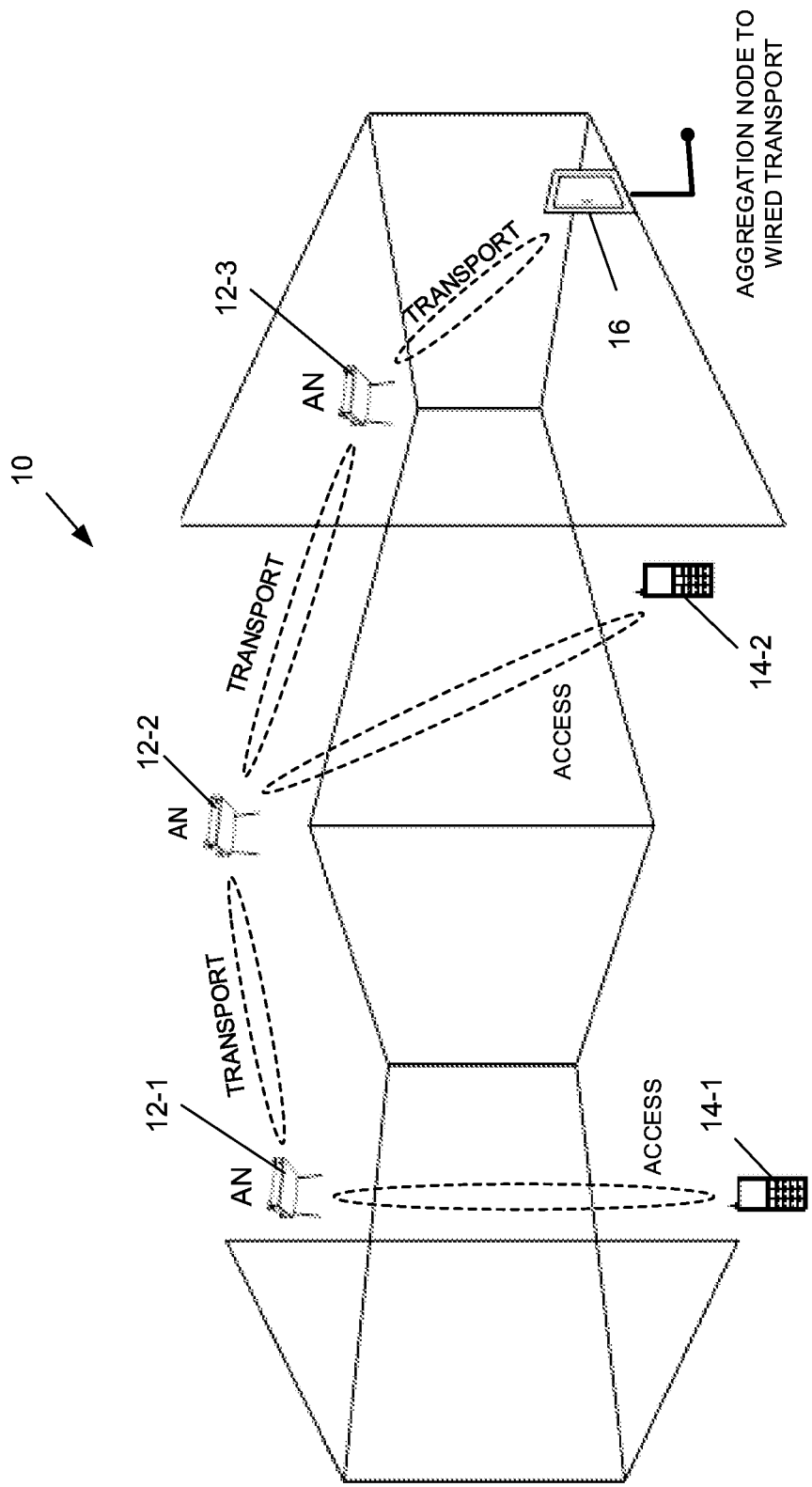
FIG. 3 illustrates one example of a wireless network that performs distributed route determination according to some embodiments of the present disclosure.

Before describing embodiments of the present disclosure, it may be beneficial to first describe one example of a wireless network 10, as illustrated in FIG. 3, that may utilize the embodiments described herein to find a route (e.g., a best or optimal route) from a source node to a destination node when taking multiple route properties, or multiple route metrics, into consideration according to some embodiments of the present disclosure. While not being limited to any particular type of wireless network, in this example, the wireless network 10 includes a number of wireless access nodes (ANs) 12-1 through 12-3 (generally referred to herein collectively as access nodes 12 and individually as access node 12) providing access to a cellular communications network to a number of wireless devices 14-1 and 14-2 (generally referred to herein collectively as wireless devices 14 and individually as wireless device 14). The access nodes 12 form a wireless mesh network for backhaul transport to, e.g., a core network of the cellular communications network via an aggregation node 16. The access nodes 12, the wireless devices 14, and the aggregation node 16 are all network nodes in the wireless network 10. The systems and methods disclosed herein may be utilized to, e.g., find optimal routes from, e.g., the aggregation node 16 to each of the other network nodes in the wireless network 10 and/or to find optimal routes from each of the network nodes 12, 14 to the aggregation node 16 taking into account multiple route properties/metrics.

Figure 4:
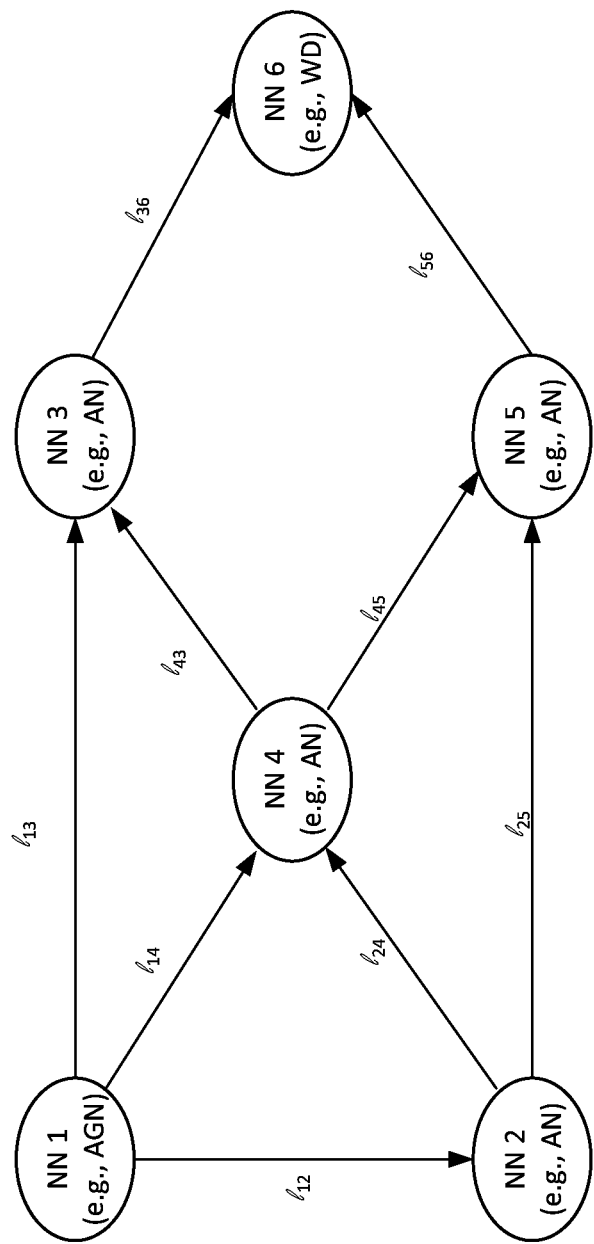
FIG. 4 is a generalized block diagram of a wireless network (e.g., the wireless network of FIG. 3) that includes a number of network nodes and links between the network nodes according to one example of a wireless network.

FIG. 4 is a generalized diagram of a wireless network (e.g., the wireless network 10 of FIG. 3). As illustrated, the wireless network includes a number of network nodes (NNs) and (potential) wireless links (l) between the network nodes. Each link is from a transmitter of one network node to a receiver of another network node. So, for instance, link $l_{12}$ is the link from the transmitter of network node NN 1 to the receiver of network node NN 2. In this context, a neighboring network node of, e.g., the network node NN 1 is another network node with which the network node NN 1 is capable of establishing a wireless link (l). So, in this example, network nodes NN 2, NN 3, and NN 4 are neighbors of the network node NN 1.

Figure 5:
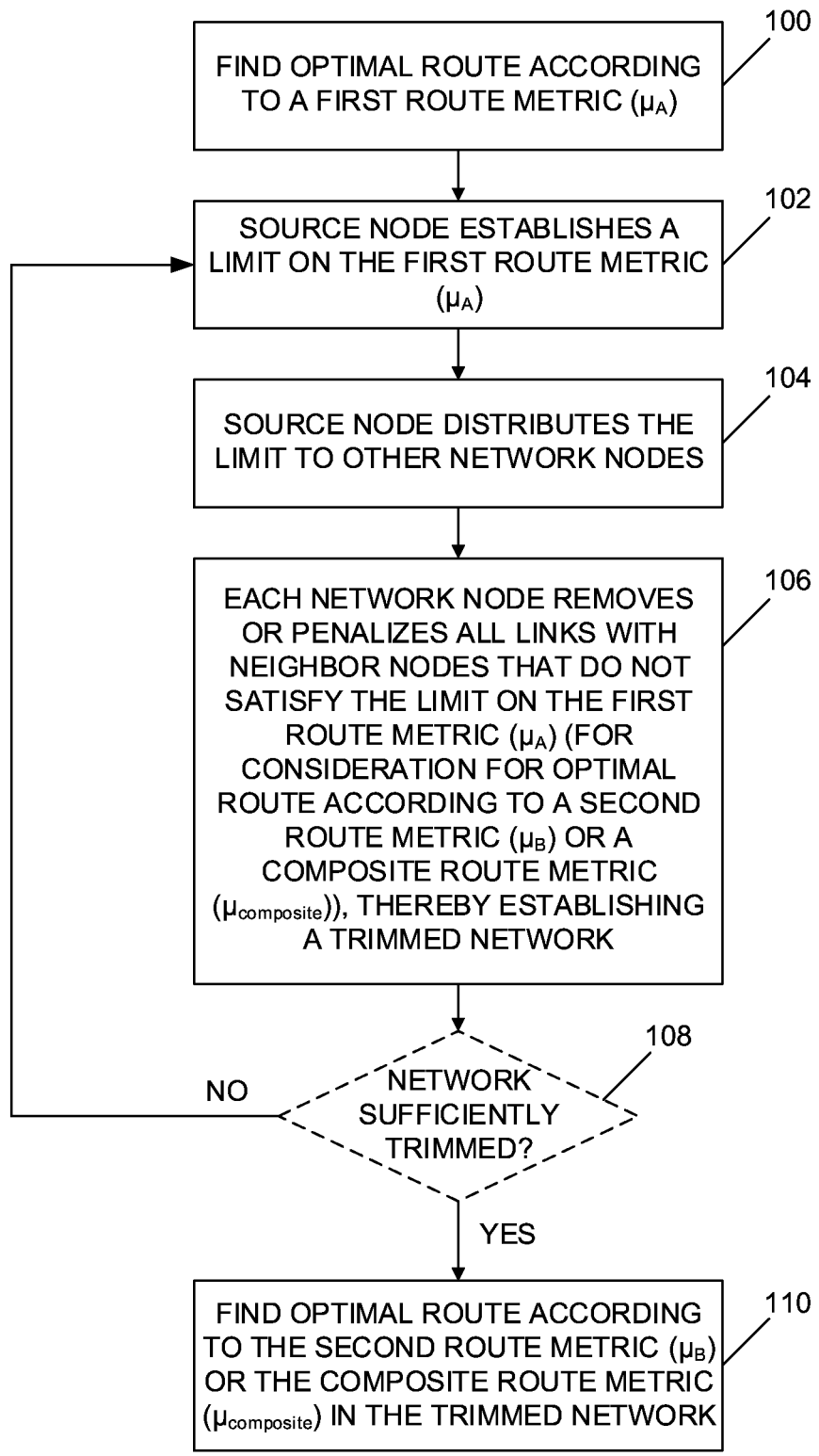
FIG. 5 illustrates a process for finding an optimal route from a source node to a destination node in a wireless network according to some embodiments of the present disclosure.

FIG. 5 illustrates a process for finding an optimal route from a source node to a destination node in a wireless network (e.g., the wireless network 10 of FIG. 3) according to some embodiments of the present disclosure. Notably, for all process figures illustrated and described herein, the "steps" may be performed in any suitable order and even in parallel unless otherwise required. In general, FIG. 5 illustrates a process for finding the optimal route (i.e., an optimal path from a source node to a destination node) through a wireless network (e.g., the wireless network 10 of FIG. 3) in accordance with a composite route metric $\mu_{composite}$ defined as above. In this example, the composite route metric $\mu_{composite}$ is the composite of a first route metric $\mu_A$ and a second route metric $\mu_B$, and includes a penalty function that effectively penalizes the second route metric $\mu_B$ if the first route metric $\mu_A$ does not satisfy a predefined limit.

In particular, FIG. 5 illustrates an example process flow for identifying an optimal route through a wireless network based on more than one route metric in accordance with some embodiments of the present disclosure. First, the optimal route(s) from a source node to a destination node through the wireless network is found based on one of the metrics, say the first route metric $\mu_A$ (step 100). If the route metric is simple enough (i.e., monotonic and isotonic), this optimal route(s) can be found in a distributed manner efficiently in polynomial time by iteratively identifying, at each network node, the best next hop neighbor node with the best route, or path, metric to the destination node. For example, if the first route metric $\mu_A$ is monotonic and isotonic, the Bellman-Ford algorithm can be used where the best route, or path, metric $\mu_A$ from each network node to the destination node is updated at each network node independently through exchange of route, or path, weights $w_{\mu_A}(P')$ among neighboring nodes at each iteration of the algorithm. The first route metric $\mu_A$ (or specifically the route, or path, weight $w_{\mu_A}(P')$) for a route from a particular network node to the destination node could, for example, consist of, or be a function of: (a) link weights $w_{\mu_A}(l)$ that represent the bit rate capacity of the links $l \in E(P')$ in the path P' from that network node to the destination node, in which case the first route metric $\mu_A$ would be a maximum metric or (b) link weights $w_{\mu_A}(l)$ that are the inverse of the link's bit rate capacity, in which case the first route metric $\mu_A$ would be a minimum metric.

Next, an acceptable limit for the first route metric $\mu_A$ is determined (e.g., at the source node for source-oriented routing) based on the route, or path, weight $w_{\mu_A}(P)$ of the optimal route(s) found in step 100 (step 102). This limit could, e.g., be selected as the weight corresponding to a bit rate that is, e.g., 90% of the optimal route's bit rate capacity. The limit can in the general case also be a soft limit, e.g., a function representing how acceptable different bit rates are in relation to the optimal route's bit rate.

The acceptable limit for the first route metric $\mu_A$ is distributed to at least some of the network nodes in the wireless network (step 104). In some embodiments, the source node floods the limit for the first route metric $\mu_A$ to all, or at least some, of the network nodes in the wireless network by, starting from the source node, having each network node receive the limit from a neighbor node and forward the information (i.e., the limit) to all of its neighbor nodes except for those whose associated link metrics exceed the limit and that from whom the information is received.

Each network node then, depending on the embodiment, removes or penalizes all links with neighboring nodes that do not satisfy the limit on the first route metric $\mu_A$ for consideration for the optimal route according to a second route metric $\mu_B$ or the composite route metric $\mu_{composite}$, thereby establishing a trimmed network (step 106). More specifically, in some embodiments, each network node removes the links to the neighbors that do not satisfy the limit on the first route metric $\mu_A$ from a neighbor list of the network node to be used when finding the optimal route for the second route metric $\mu_B$, thereby actually trimming the neighbor list of the network node. This, in effect, implements the penalty function T(•) of the composite route metric $\mu_{composite}$. In other embodiments, each network node penalizes the links to the neighbors that do not satisfy the limit on the first route metric $\mu_A$ using the composite route metric $\mu_{composite}$ for the all of the links such that the neighbor list is effectively trimmed via the associated penalty, as described above.

For example, the first route metric $\mu_A$ may be bit rate capacity, and the trimming could consist of having each network node remove all links with its neighbors whose bit rate capacity is below the bit rate corresponding to the limit on the first route metric $\mu_A$. It is then easy to see that the trimming (a) does not disallow any route having a bit rate capacity above the limit bit rate (because such routes could anyway not have utilized any of the removed links) and (b) leads to a network in which all possible routes have bit rates equal to or exceeding the limit bit rate (since all individual links support this bit rate). These properties will be useful in a later step. In the more general case, the trimming can be soft, i.e., links may not be completely removed but rather penalized in terms of increasing the weights of the other route metric (i.e., the second metric $\mu_B$), as discussed above.

Optionally, in some embodiments, a determination is made as to whether the wireless network is sufficiently trimmed (step 108). For example, if after trimming the network based on the limit in step 106, the resulting number of nodes is too high, the process can return to step 102, where a new limit is established, and the process resumes from there. Likewise, if the network is overly trimmed, a new, higher limit can be used to trim the network.

Lastly, the optimal route from the source node to the destination node based on the second route metric $\mu_B$ or, alternatively, the composite route metric $\mu_{composite}$ (in the case of applying a soft penalty to the second route metric $\mu_B$ according to Equation (6) above) is found in a distributed manner (step 110). The second route metric $\mu_B$ is utilized in embodiments where the neighbor lists are actually trimmed according to the limit on the first route metric $\mu_A$. The composite route metric $\mu_{composite}$ is utilized in embodiments where the neighbor lists are not trimmed but, instead, a soft penalty function T(•) is applied to the second route metric $\mu_B$. Notably, using the composite route metric $\mu_{composite}$ may sometimes be referred to herein as utilizing the second route metric $\mu_B$ after penalizing the second route metric $\mu_B$ for any links/neighbors that do not satisfy the defined limit on the first route metric $\mu_A$.

More specifically, the optimal route based on the second route metric $\mu_B$ or the composite route metric $\mu_{composite}$ is found in the trimmed network by iteratively identifying, at each network node, the best next hop neighbor node with the best route, or path, metric to the destination node with respect to the second route metric $\mu_B$ or the composite route metric $\mu_{composite}$. In the embodiments where the second route metric $\mu_B$ is used, step 110 has moderate (polynomial-time) computational complexity. The so found optimal route will then be guaranteed to be on the right side of the limit for the first route metric $\mu_A$ determined in step 102. For example, in the case of the first route metric $\mu_A$ representing the bit rate capacity, the properties (a) and (b) established above will ensure that the found route has a bit rate at least equal to the limit bit rate. Note that in the case when the trimming is soft in step 106, the composite route metric $\mu_{composite}$ is used to determine the optimal route in step 110, as discussed above.

Figure 6:
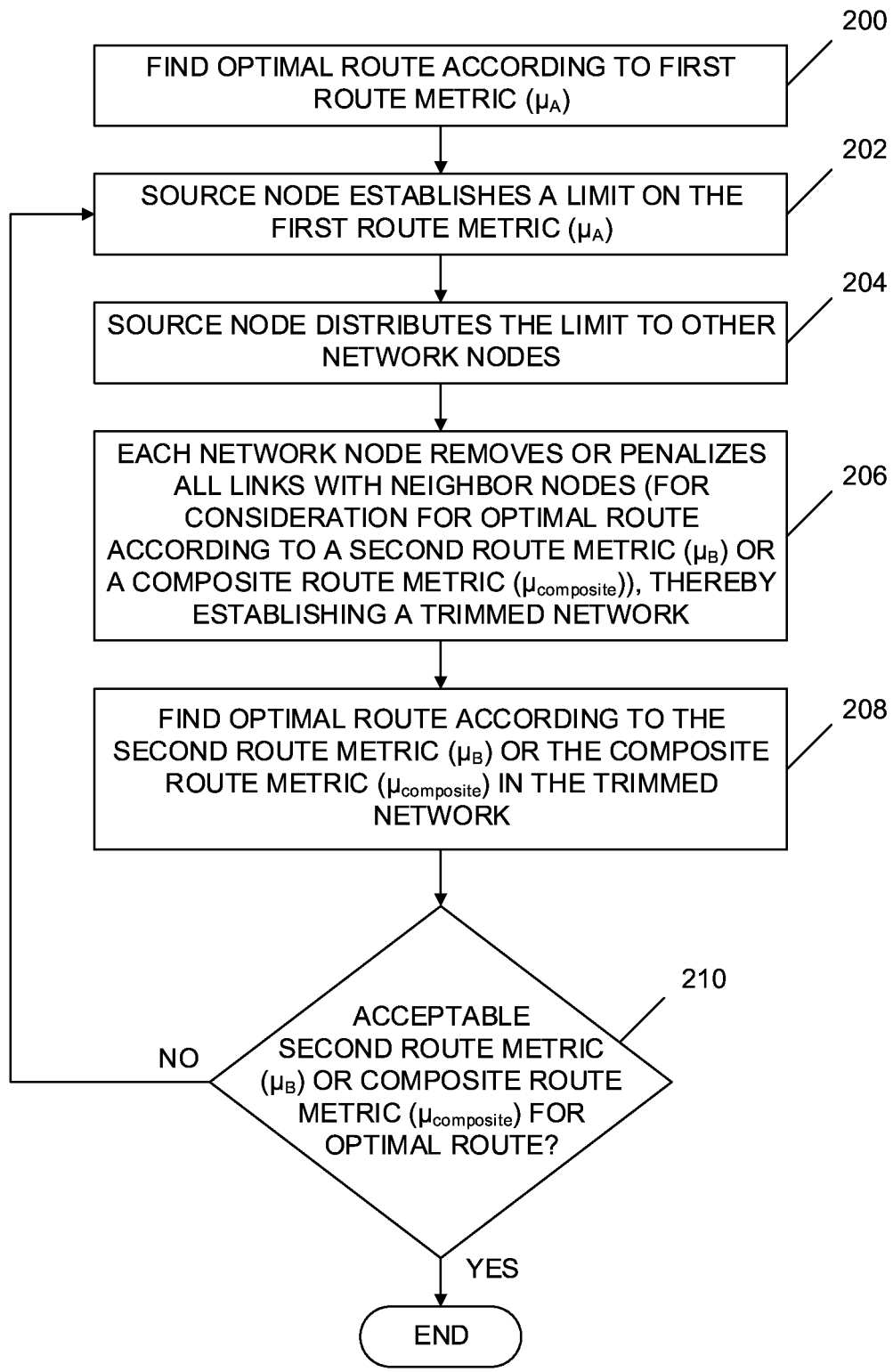
FIG. 6 illustrates an example process flow for identifying an optimal route through a wireless network based on more than one route metric in which the process may be iteratively repeated until the optimal route is acceptable in accordance with some other embodiments of the present disclosure.

FIG. 6 illustrates an example process flow for identifying an optimal route through a wireless network based on more than one route metric in accordance with some other embodiments of the present disclosure. This process is, in general, an extension of the process formed by steps 100-106 and 110 of FIG. 5 where, after selecting a suitable limit on the first route metric $\mu_A$ and executing steps 104, 106, and 110, the second route metric $\mu_B$ (or the composite route metric $\mu_{composite}$) of the best route, or path, is known at the source node. If this value is good enough (e.g., satisfies some predefined threshold or criterion), the process ends. However, if the second route metric $\mu_B$ (or the composite route metric $\mu_{composite}$) of the best route, or path, is non-acceptable (e.g., does not satisfy some predefined threshold or criterion), the process returns to step 102, and a new limit for the first route metric $\mu_A$ is set. For example, if the limit for the first route metric $\mu_A$ was previously set in the first run to 90%, the new limit for the first route metric $\mu_A$ could now be set to 80%. The process is then repeated using the new limit on the first route metric $\mu_A$ such that the network is trimmed accordingly. Step 110 is executed in the new trimmed network to thereby find, or select, the new optimal route in the new trimmed network according to the second route metric $\mu_B$ or the composite route metric $\mu_{composite}$. If the resulting second route metric $\mu_B$ is still not acceptable, the process is again repeated for an even more relaxed limit on the first route metric $\mu_A$, and so on.

More specifically, as illustrated in FIG. 6, steps 200 through 208 correspond to steps 100 through 106 and 110 of FIG. 5, respectively. As such, the details are not repeated. In this embodiment, after the optimal route according to the second route metric $\mu_B$ or the composite route metric $\mu_{composite}$ is found in step 208, a determination is made (preferably by the source node for source-oriented routing) as to whether the second route metric $\mu_B$ or the composite route metric $\mu_{composite}$ for the optimal route found in step 208 is acceptable (step 210). This may be done by comparing the path weight $w_{\mu_B}(P)$ or $w_{composite}(P)$ to a predefined threshold or criterion. If the path weight $w_{\mu_B}(P)$ or $w_{composite}(P)$ (depending on the embodiment) does not satisfy the predefined threshold or criterion, then the second route metric $\mu_B$ or the composite route metric $\mu_{composite}$ for the optimal route found in step 208 is determined to be unacceptable, in which case the process returns to step 202 where a new, more relaxed limit on the first route metric $\mu_A$ is established. Steps 204 through 208 are then repeated based on the new, more relaxed limit on the first route metric $\mu_A$. This process is repeated until the second route metric $\mu_B$ or the composite route metric $\mu_{composite}$ for the optimal route found in step 208 is acceptable. At that point, the process ends.

Figure 7:
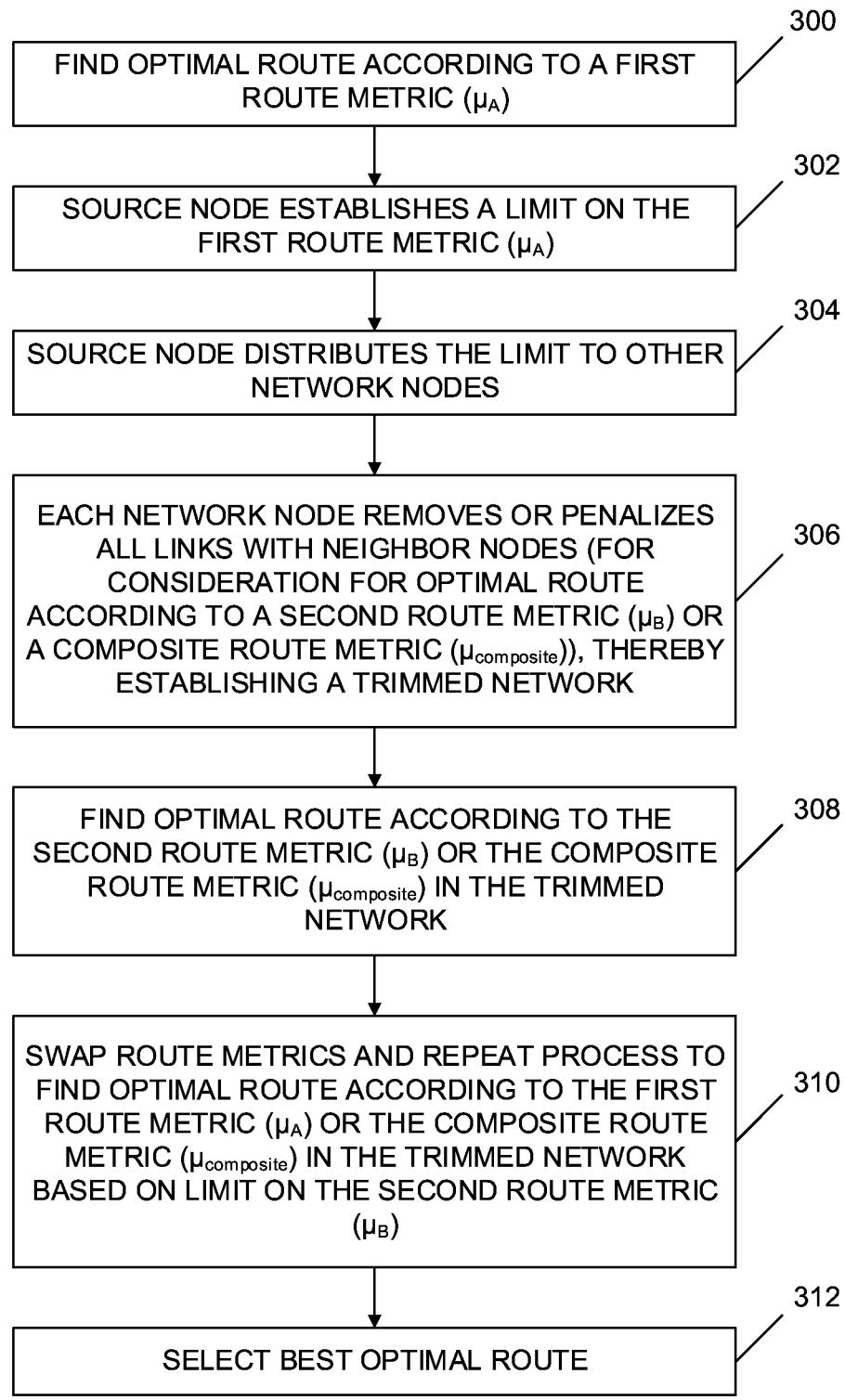
FIG. 7 illustrates an example process flow for identifying an optimal route through a wireless network based on more than one route metric in accordance with some other embodiments of the present disclosure.

FIG. 7 illustrates an example process flow for identifying an optimal route through a wireless network based on more than one route metric in accordance with some other embodiments of the present disclosure. This process is, in general, an extension of the process formed by steps 100-106 and 110 of FIG. 5 where the order in which the route metrics are considered is swapped and then the best of the optimal routes is selected. First, as outlined above, the best or optimal route(s) with respect to the first route metric $\mu_A$ is determined, a suitable limit for the first route metric $\mu_A$ is determined based on the path weight(s) of the optimal routes with respect to the first route metric $\mu_A$, the network is trimmed, and the best or optimal route in the trimmed network with respect to the second route metric $\mu_B$ or the composite route metric $\mu_{composite}$ (depending on the embodiment) is determined (steps 300 through 308). This best or optimal path is denoted P1 and the associated metrics $\mu_A(P1)$ and $\mu_B(P1)$ or $\mu_{composite}(P1)$.

In the second phase, the same steps are executed, but with the first and second route metrics $\mu_A$ and $\mu_B$ or the composite route metric $\mu_{composite}$ exchanged or swapped (step 310). Specifically, best route(s) with respect to the second route metric $\mu_B$ are determined, a suitable limit for the second route metric $\mu_B$ is determined based on the path weight(s) of the optimal routes with respect to the second route metric $\mu_B$, the network is trimmed based on the limit on the second route metric $\mu_B$, and the best or optimal route in the trimmed network with respect to the first route metric $\mu_A$ or the composite route metric $\mu_{composite}$ (depending on the embodiment) is determined. This best or optimal path is denoted P2 and the associated metrics $\mu_B(P2)$ and $\mu_A(P2)$ or $\mu_{composite}(P2)$.

The best of the two paths P1 and P2 is then selected as the desired (e.g., most optimal) path P based on the different route metrics for the two paths P1 and P2 (step 312). The selection between P1 and P2 at the source node considers the route metrics of both paths P1 and P2 (i.e., $\mu_A(P1)$ and either $\mu_B(P1)$ or $\mu_{composite}(P1)$ for P1 and $\mu_A$ and $\mu_B(P2)$ and either $\mu_A$ (P2) or $\mu_{composite}(P2)$ for P2). Specifically, in some embodiments, $$P = \underset{P' \in \{P1, P2\}}{\mathrm{argmin}}\, f(\mu_A(P'), \mu_B(P')), \quad (9)$$

where $f(\cdot)$ is an appropriate function combining $\mu_A$ and $\mu_B$. In embodiments using the composite route metric $\mu_{composite}$, a similar function may be used to combine $\mu_A$ and $\mu_{composite}$ for P1 and $\mu_B$ and $\mu_{composite}$ for P2.

Figure 8:
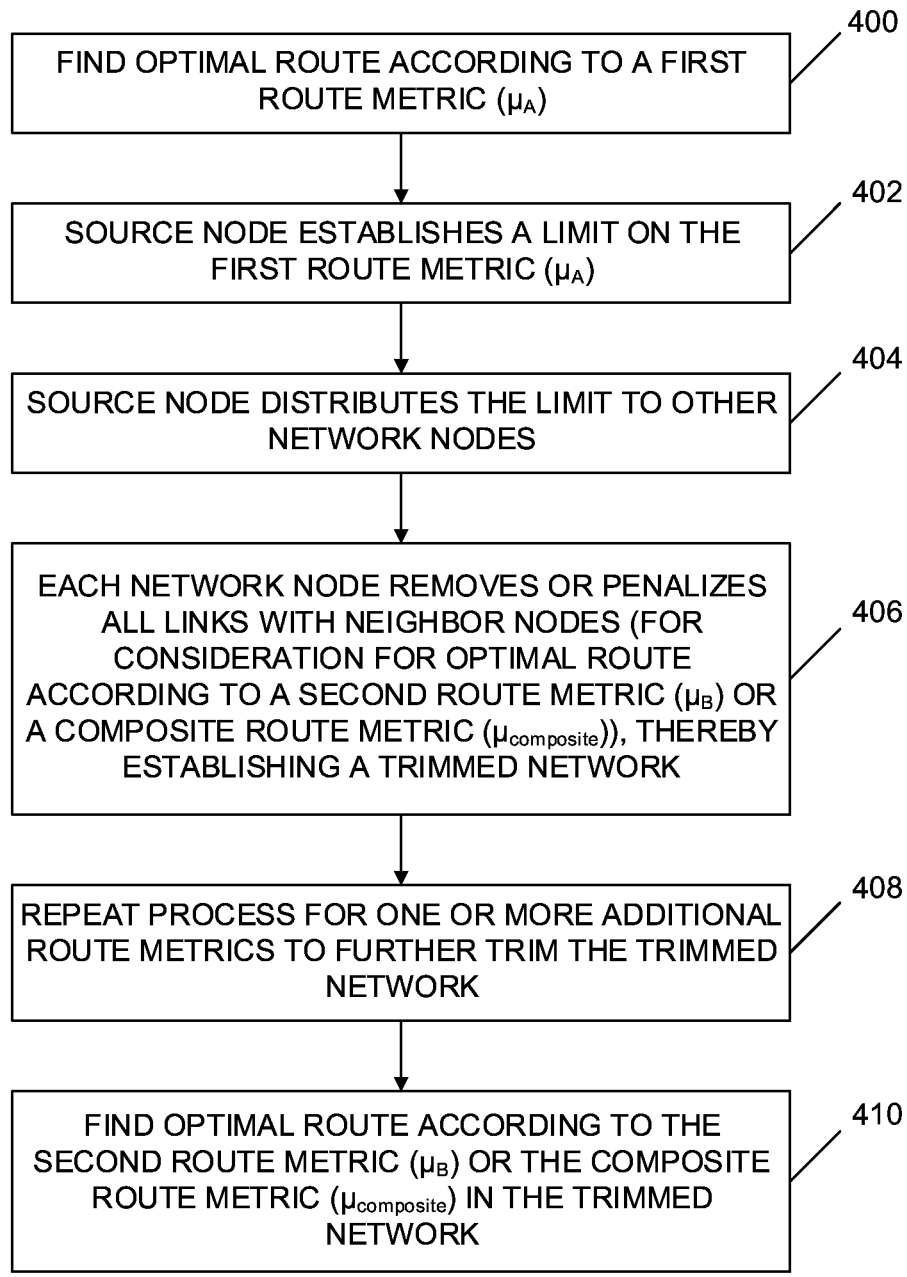
FIG. 8 illustrates an example process flow for identifying an optimal route through a wireless network based on more than one route metric in which the ordering of the route metrics is swapped in accordance with some other embodiments of the present disclosure.

FIG. 8 illustrates an example process flow for identifying an optimal route through a wireless network based on more than one route metric in accordance with some other embodiments of the present disclosure. This process is, in general, an extension of the process formed by steps 100-106 and 110 of FIG. 5 where the described method is generalized to a larger number of route metrics by iterating the above procedure. For example, for more than two route metrics, one can first trim the network to keep only $k_1$ optimal links for the first route metric $\mu_A$, and then further trim the network to keep only $k_2$ optimal links, and so forth. Finally, the optimal path is found according to the last route metric over the trimmed network. Also, one or both of the first and second route metrics $\mu_A$ and $\mu_B$ may in turn be composite route metrics composed from other more basic monotonic and isotonic metrics.

This process is illustrated in FIG. 8. Steps 400 through 406 correspond to steps 100 through 106 of FIG. 5. As such, the details are not repeated. In this embodiment, after trimming the network based on the limit on the first route metric $\mu_A$, the processes (i.e., steps 400 through 406) are repeated for one or more additional route metrics to further trim the trimmed network (step 408). Specifically, for each additional route metric, the optimal route from the source node to the destination node through the trimmed network according to this additional route metric is found. This optimal route is then used to establish a limit on the additional route metric, where this limit on the additional route metric is then used to further trim the trimmed network. This process is repeated for each additional route metric. Once trimming of the network is complete, the optimal route through the trimmed network with respect to the second route metric $\mu_B$ or the composite route metric $\mu_{composite}$ (depending on the embodiment) is found, as described above (step 410).

Figure 9:
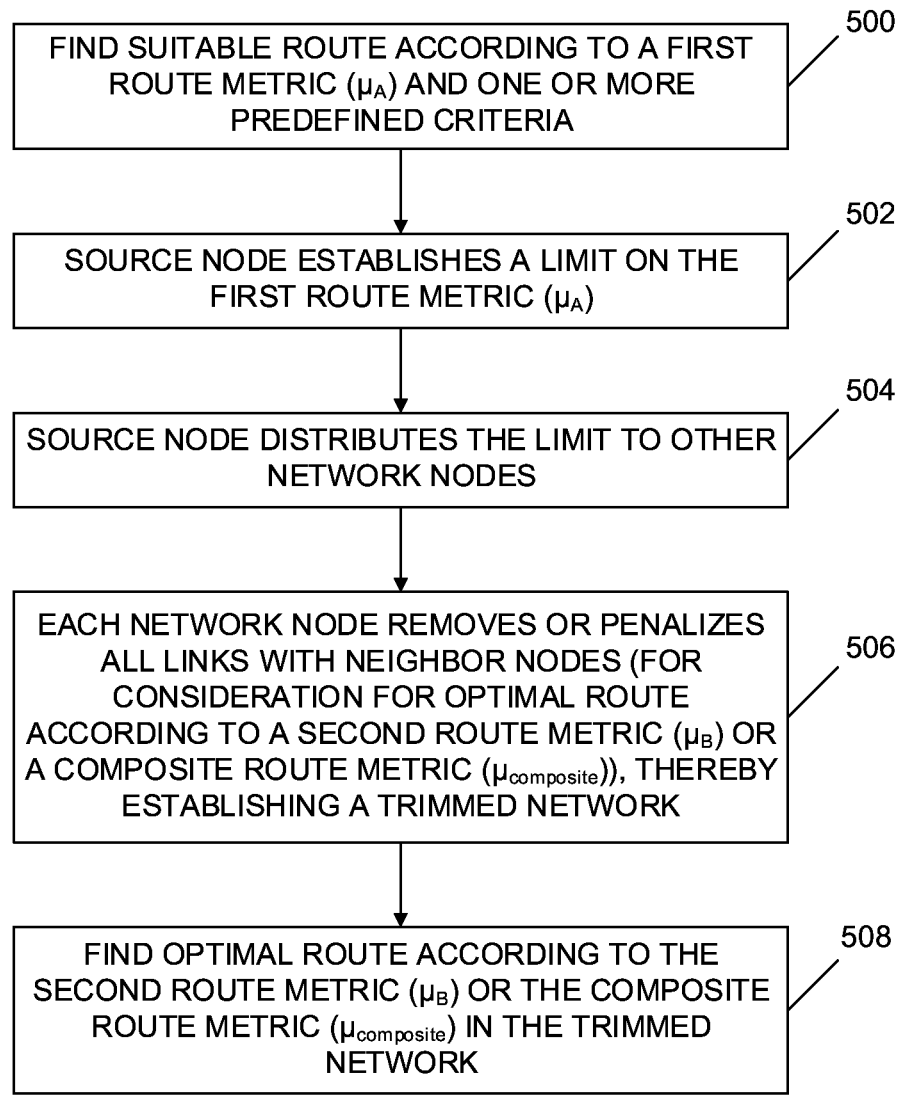
FIG. 9 illustrates an example process flow for identifying an optimal route through a wireless network based on more than one route metric in accordance with some other embodiments of the present disclosure.

In the embodiments of FIGS. 5 through 8, the limit on the route metric(s) used to trim the network is established based on the optimal route(s) through the network for that route metric(s). However, as an alternative to finding the optimal route in steps 100, 200, 300, and 400, a simplified algorithm may be used to find a route that is good enough based on some predefined criterion, and then use that route, instead of the optimal route, as the basis for the remaining steps. In this regard, as an example, FIG. 9 illustrates a process similar to that of FIG. 5 but where a "good enough" route is found in step 500 rather than the optimal route (as in step 100 of FIG. 5). As illustrated, a suitable route from the source node to the destination node with respect to the first route metric $\mu_A$ is found (step 500). The suitable route may be any route having, e.g., a path weight $w_{\mu_A}(P)$ that satisfies some predefined criterion (e.g., satisfies a predefined threshold). This suitable route may be found using any suitable algorithm, and this suitable route does not need to be the best or optimal route. From this point, the process proceeds as described above. In particular, steps 502 through 508 are performed as discussed above with respect to steps 102 through 106 and 110 of FIG. 5. In the same manner, a suitable route may be found, instead of the optimal route, in steps 200, 300, and 400 of FIGS. 6 through 8, respectively.

Figure 10:
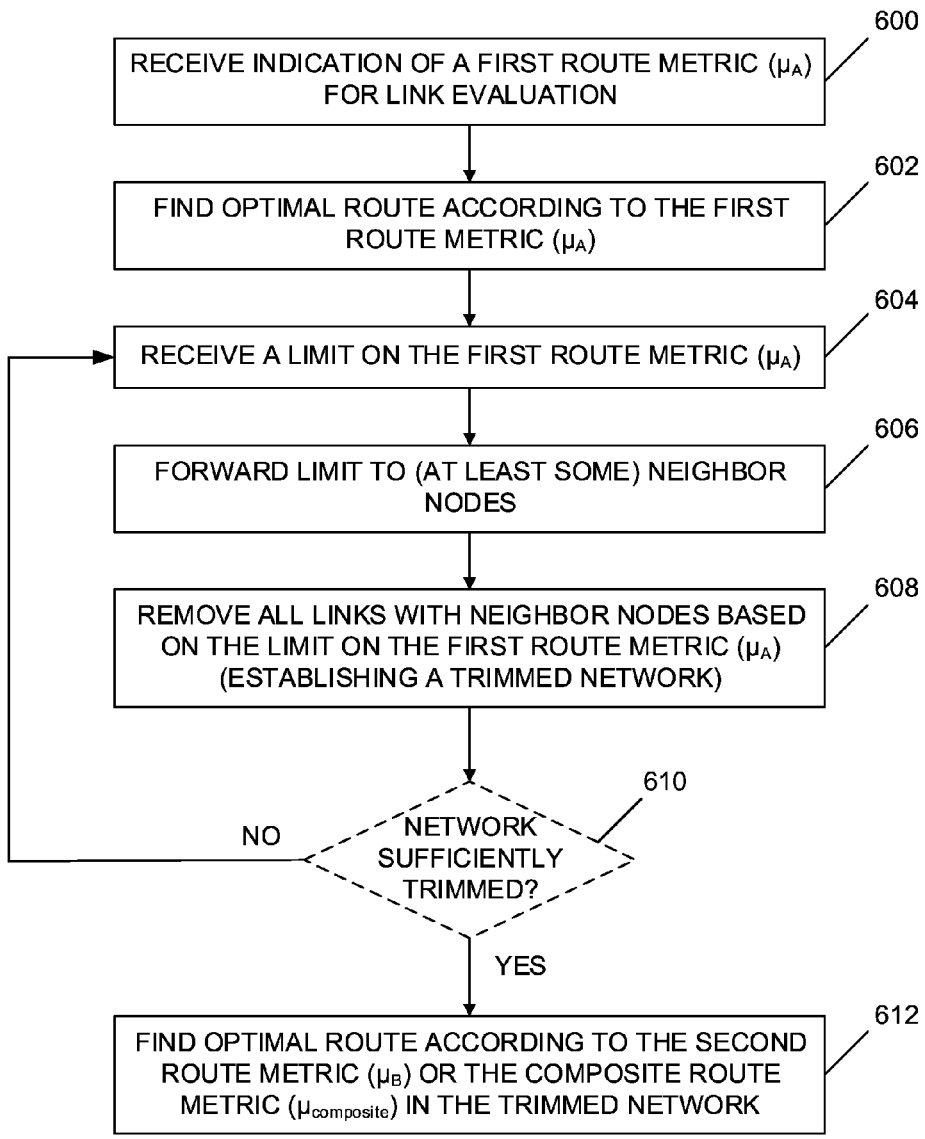
FIG. 10 illustrates the operation of a network node to enable distributed route determination based on more than one route metric in accordance with some embodiments of the present disclosure.

While FIGS. 5 through 9 relate to the operation of the wireless network as a whole, FIGS. 10, 11, 12A, 12B, 13A, and 13B relate to the operation of each individual network node, particularly the intermediate network nodes and, for source-oriented routing, the source network node. An intermediate network node is a network node that is between the source node and the destination node along any path through the wireless network. In this regard, FIG. 10 illustrates the operation of a network node according to some embodiments of the present disclosure. In the context of a multi-hop network, a source node is trying to send data to a destination node via one or more intermediate nodes. An optimal route path from the source node to the destination node is first determined by the source node (in source-oriented routing embodiments) using the first route metric $\mu_A$. This first route metric $\mu_A$ may be, for example, predetermined by a controller associated with the source node, the network, or the service provider. During operation, the network node receives an indication of the first route metric $\mu_A$ for link evaluation (step 600). In some instances, this step may be performed once, e.g., upon network establishment and updated periodically. However, step 600 is optional in that the first route metric $\mu_A$ may be predefined or preconfigured at the network node.

The network node determines (together with the other network nodes in a distributed manner) an optimal route according to the first route metric $\mu_A$ (step 602). More specifically, the network node evaluates the links to its neighbors based on the first route metric $\mu_A$ (each intermediate node performs this step, thereby establishing an optimal route from the source node to the destination node in a distributed manner for the first route metric $\mu_A$). Because two metrics are under consideration, a limit on the first route metric $\mu_A$ is established to allow for the second route metric $\mu_B$ to have an impact on the route determination. The limit can be established by the source node or can be set by a network operator. This limit is received by the network node (step 604), and the network node transmits, or forwards, the limit to (at least some of) its neighboring nodes (step 606). The network node uses the limit to trim the number of neighboring nodes of the network node for consideration when finding the optimal route according to the second route metric $\mu_B$, as discussed above (step 608). For example, links having a quality that do not satisfy the limit on the first route metric $\mu_A$ can actually be removed from a neighbor list or the link weights $w_{\mu_B}(l)$ for those links can be penalized to effectively remove those links from consideration for the optimal route.

Optionally, in some embodiments, a determination is made as to whether the network is sufficiently trimmed (step 610). For example, if after trimming the network based on the limit in step 608, the resulting number of nodes is too high, the process can return to step 604, where a new limit is received, and the process resumes from there. Likewise, if the network is overly trimmed, a new, higher limit can be used to trim the network. Lastly, an optimal route can be found, or determined, using the second route metric $\mu_B$ or, alternatively, the composite route metric $\mu_{composite}$ in a distributed manner, as described above (step 612). This optimal route uses only links/network nodes in the trimmed network.

Figure 11:
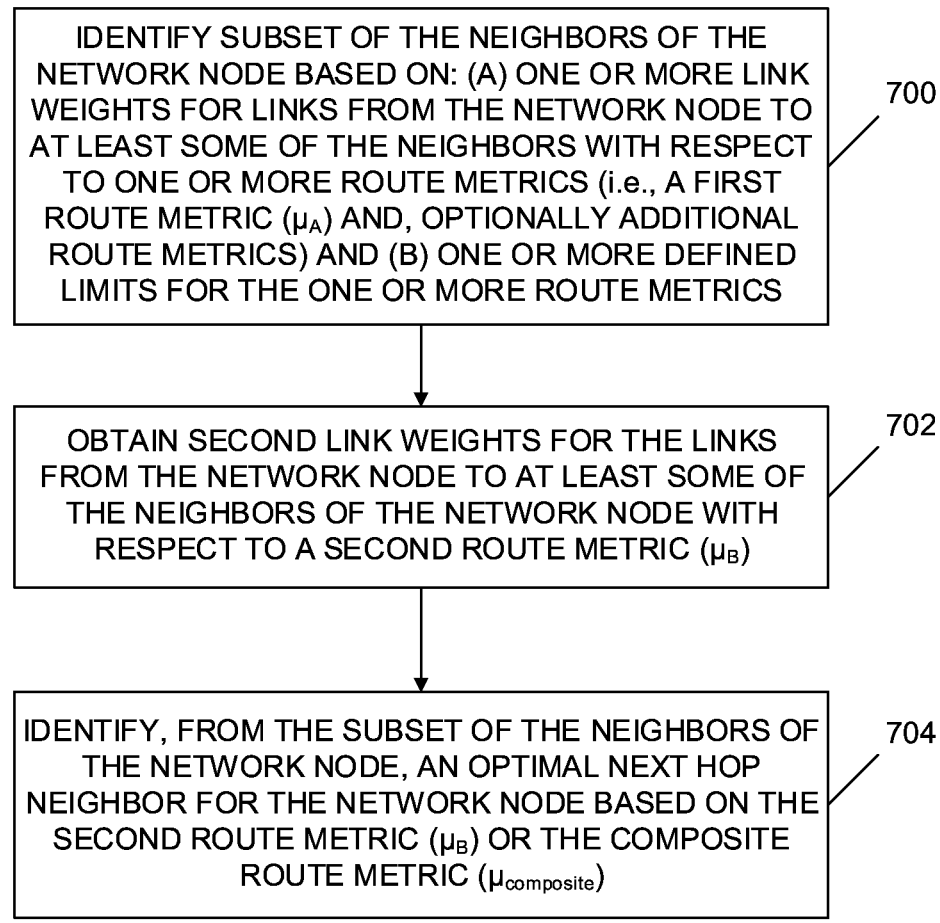
FIG. 11 illustrates the operation of a network node to enable distributed route determination based on more than one route metric in accordance with some other embodiments of the present disclosure.

FIG. 11 illustrates the operation of a network node according to some embodiments of the present disclosure. This process corresponds to that of FIG. 10 but without the steps relating to establishing the limit on the first route metric $\mu_A$. As discussed above, the steps relating to establishing the limit on the first route metric $\mu_A$ are optional in that the limit on the first route metric $\mu_A$ may be established in different ways or even predefined. When predefined in particular, there is no need to find the optimal or even acceptable route through the network in order to establish the limit on the first route metric $\mu_A$ because the limit is already defined.

As illustrated, the network node identifies a subset of the neighbors of the network node (or equivalently a subset of the links to the neighbors of the network node) for consideration when finding the optimal or best route with respect to the second route metric $\mu_B$ or the composite route metric $\mu_{composite}$, depending on the embodiment (step 700). As discussed above, this subset of the neighbors is identified based on: (a) one or more link weights for one or more links from the network node to at least some of the neighbors of the network node with respect to one or more route metrics (e.g., the first route metric $\mu_A$ and, optionally, one or more additional route metrics) and (b) one or more defined limits for the one or more route metrics. As discussed above, the network node also obtains second link weights for the links from the network node to at least some of the neighbors of the network node with respect to a second route metric $\mu_B$ (step 702).

Lastly, the network node identifies, from the subset of the neighbors of the network node, an optimal next hop neighbor for the network node based on the second route metric $\mu_B$ or, alternatively, the composite route metric $\mu_{composite}$, depending on the embodiment (step 704). As discussed above, in some embodiments, the network is trimmed by actually removing neighbors/links from consideration for the optimal route with respect to the second route metric $\mu_B$. In this case, the subset of the neighbors corresponds to the trimmed network, and the optimal route with respect to the second route metric $\mu_B$ is through this trimmed network. In other embodiments, rather than actually removing links/neighbors from consideration, the link weights $w_{\mu_B}(l)$ of the neighbors/links that do not satisfy the limit(s) on the route metric(s) of step 700 (i.e., the neighbors or corresponding links that are not in the subset identified in step 702) are penalized when identifying the optimal route according to the composite route metric $\mu_{composite}$.

Figure 12A:
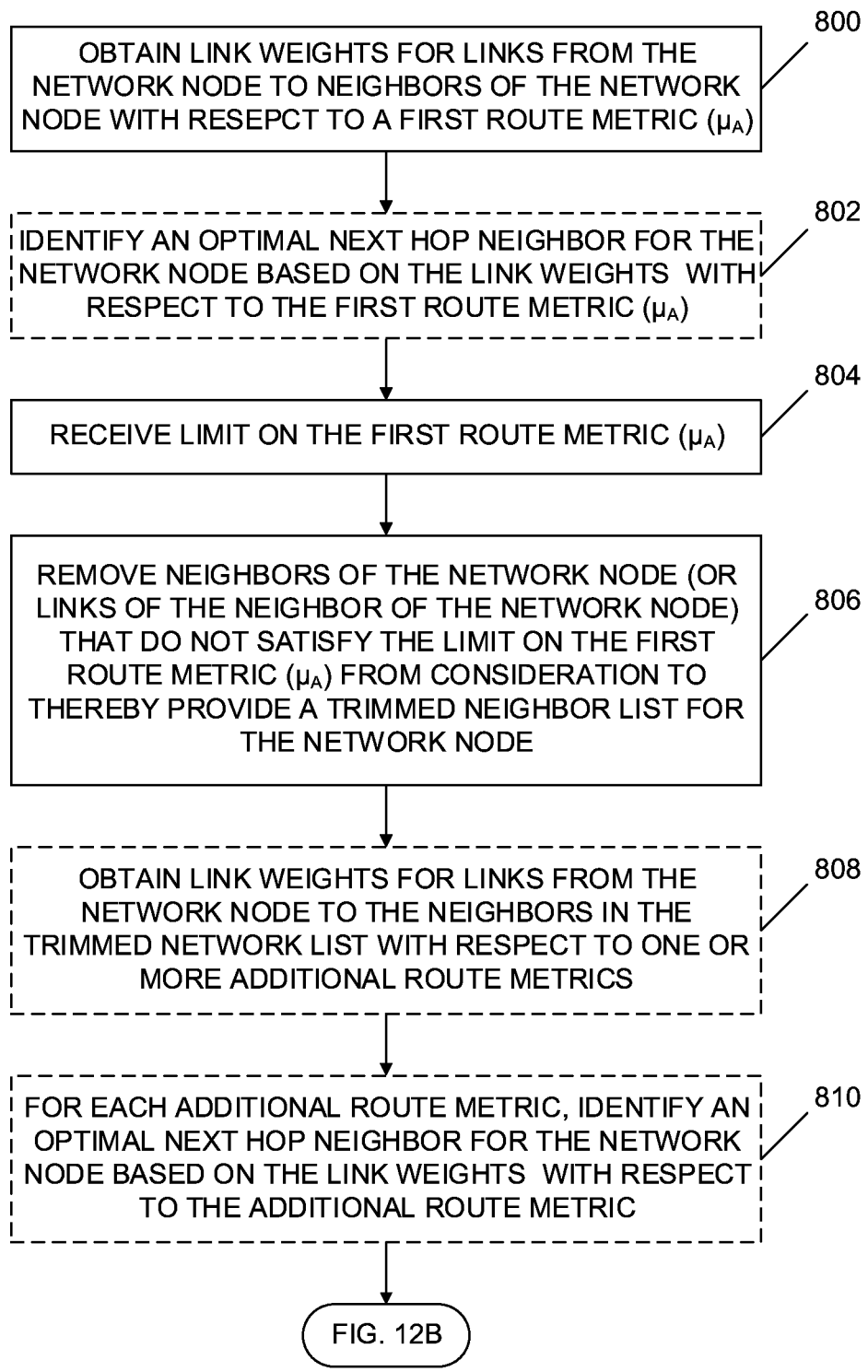
FIGS. 12A and 12B illustrate the operation of a network node to enable distributed route determination based on more than one route metric in which trimming of the network is performed by removing neighbors from a neighbor list of the network node in accordance with some other embodiments of the present disclosure.
Figure 12B:
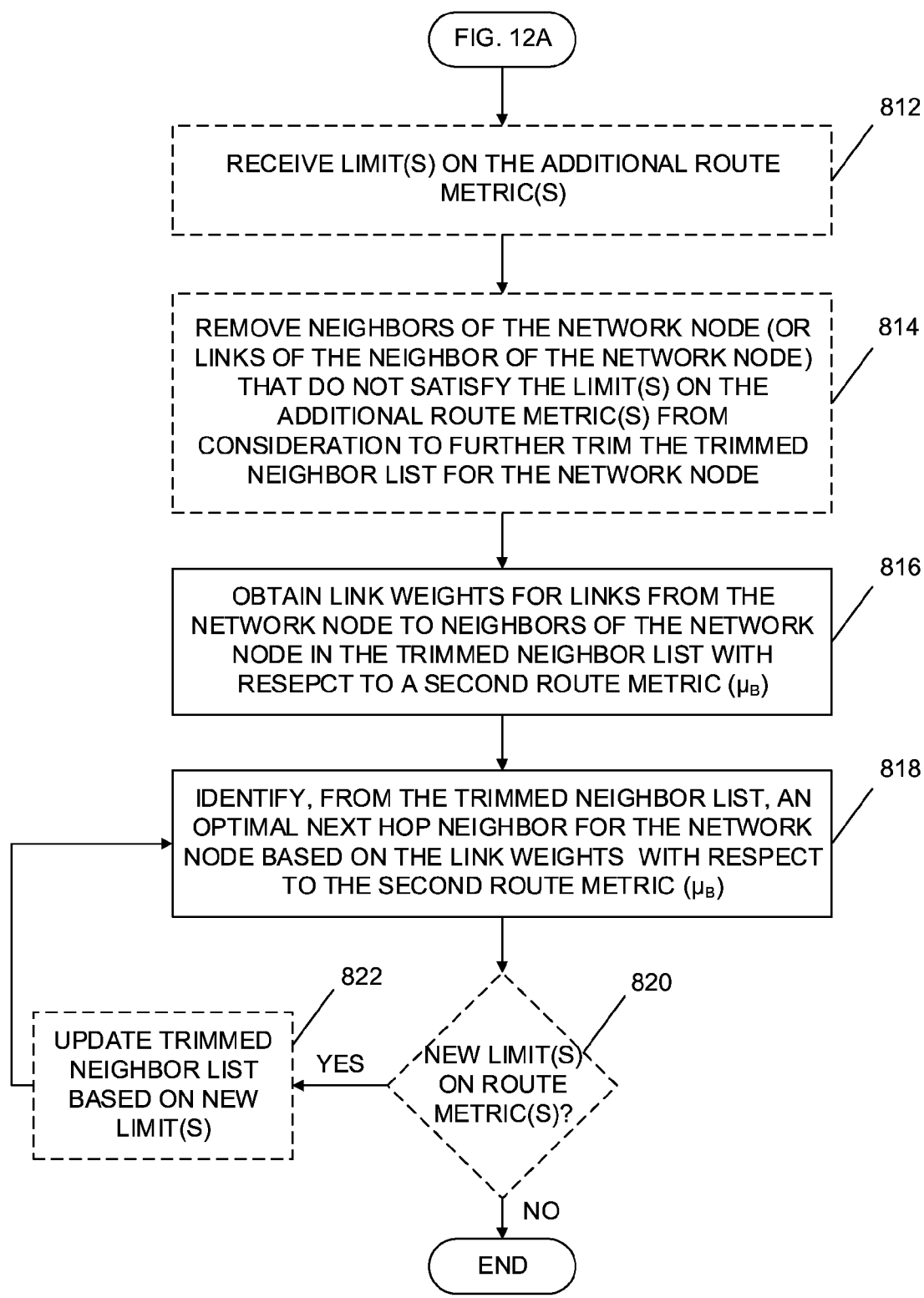

FIGS. 12A and 12B illustrate the operation of a network node in more detail according to some embodiments of the present disclosure. The process of these figures illustrates features that were already described above with respect to the network in general (see, e.g., FIGS. 5 through 9) but focuses on the operation of the individual network node. As illustrated, the network node obtains link weights for links from the network node to neighbors (all or at least some neighbors) of the network node with respect to the first route metric $\mu_A$ (step 800). The link weights may be obtained using any suitable technique, which may vary depending on the particular implementation of the first route metric $\mu_A$. Optionally, in some embodiments, the network node, using any suitable technique, identifies the optimal next hop neighbor for the network node based on the link weights with respect to the first route metric $\mu_A$ (step 802). The network node receives a limit on the first route metric $\mu_A$ from at least one of its neighbors (step 804).

In this example, the network node then removes neighbors of the network node (or links of the neighbors) that do not satisfy the limit on the first route metric $\mu_A$ from consideration for the subsequent steps to thereby provide a trimmed neighbor list for the network node (i.e., establish a trimmed network) step 806). Optionally, in some embodiments, this process is repeated for one or more additional route metrics to thereby further trim the neighbor list of the network node (steps 808 through 814). The network node also obtains link weights for links from the network node to neighbors of the network node in the trimmed neighbor list with respect to the second route metric $\mu_B$ (step 816). The network node then identifies, from the trimmed neighbor list (i.e., the trimmed network), the optimal next hop neighbor of the network node based on the link weights with respect to the second route metric $\mu_B$ (step 818).

Optionally, in some embodiments, the network node determines whether new limit(s) for any of the route metric(s) is received (step 820). This may occur when, for example, the source node determines that the second route metric $\mu_B$ for the optimal route identified in step 818 is not acceptable, in which case the source node may relax the limit on the first route metric $\mu_A$ and/or the limit(s) on any additional route metric(s). If new a limit(s) is received, the network node updates the trimmed neighbor list based on the new limit(s) (step 822) and then the process returns to step 818 and is repeated for the updated trimmed neighbor list. If no new limit(s) is received (e.g., within some predefined amount of time), the process ends.

Figure 13A:
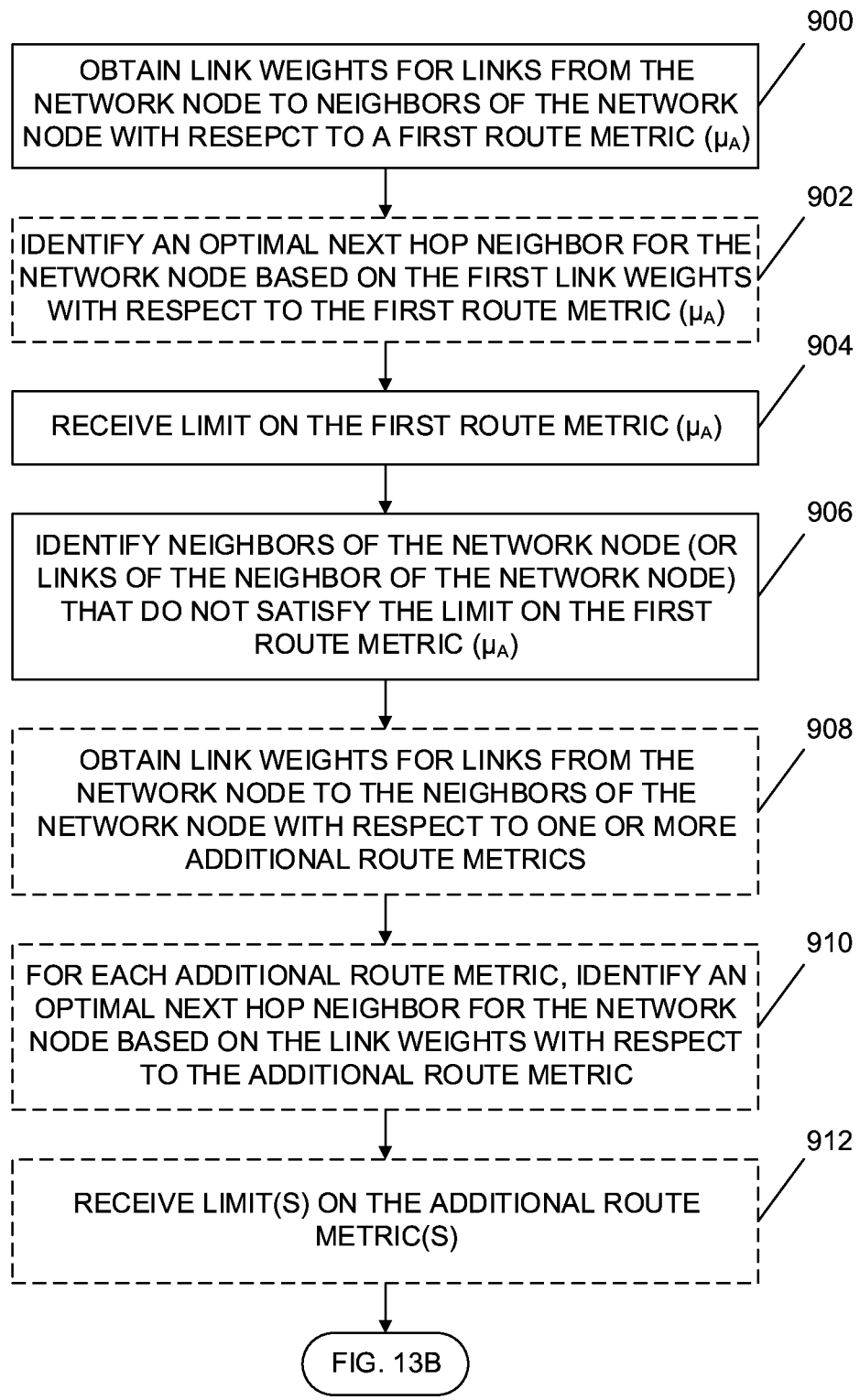
FIGS. 13A and 13B illustrate the operation of a network node to enable distributed route determination based on more than one route metric in which trimming of the network is performed by penalizing link weights in accordance with some other embodiments of the present disclosure.
Figure 13B:
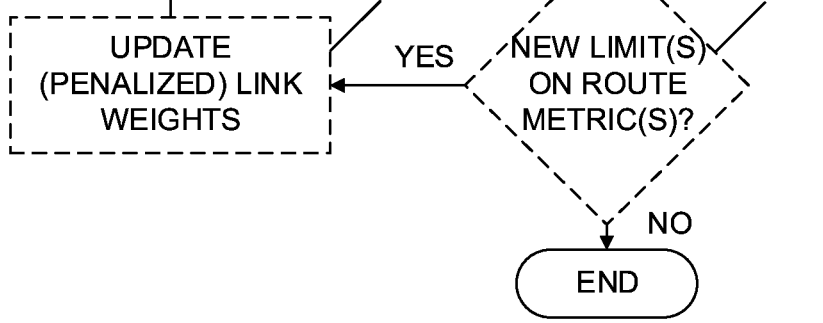

FIGS. 13A and 13B illustrate the operation of a network node in more detail according to some embodiments of the present disclosure. The process of these figures illustrates features that were already described above with respect to the network in general (see, e.g., FIGS. 5 through 9) but focuses on the operation of the individual network node. This process is similar to that of FIGS. 12A and 12B but where a soft penalty is applied to effectively trim the neighbor list of the network node. As illustrated, the network node obtains links weights for links from the network node to neighbors (all or at least some neighbors) of the network node with respect to the first route metric $\mu_A$ (step 900). The link weights may be obtained using any suitable technique, which may vary depending on the particular implementation of the first route metric $\mu_A$. Optionally, in some embodiments, the network node, using any suitable technique, identifies the optimal next hop neighbor for the network node based on the link weights with respect to the first route metric $\mu_A$ (step 902). The network node receives a limit on the first route metric $\mu_A$ from at least one of its neighbors (step 904).

In this example, the network node identifies neighbors of the network node (or links of the neighbors) that do not satisfy the limit on the first route metric $\mu_A$ (step 906). Optionally, in some embodiments, this process is repeated for one or more additional route metrics to identify neighbors of the network node (or links of the neighbors) that do not satisfy limit(s) for an additional route metric(s) (steps 908 through 914). The network node also obtains link weights for links from the network node to neighbors of the network node in the trimmed neighbor list with respect to the second route metric $\mu_B$ (step 916). The network node then penalizes the link weights with respect to the second route metric $\mu_B$ for the neighbors identified as not satisfying the limit on the first route metric $\mu_A$ (step 918). Optionally, in some embodiments, the network node also penalizes the link weights with respect to the second route metric $\mu_B$ for the neighbors identified as not satisfying the limit(s) on the additional route metric(s) (step 920).

The network node then identifies the optimal next hop neighbor of the network node based on the link weights with respect to the second route metric $\mu_B$ after penalization of the appropriate link weights in step 918 and, optionally step 920 (step 922). In some embodiments, the penalization is provided via the composite route metric $\mu_{composite}$, as described above. Optionally, in some embodiments, the network node determines whether new limit(s) for any of the route metric(s) is received (step 924). This may occur when, for example, the source node determines that the second route metric $\mu_B$ or the composite route metric $\mu_{composite}$ for the optimal route identified in step 922 is not acceptable, in which case the source node may relax the limit on the first route metric $\mu_A$ and/or the limit(s) on any additional route metric(s). If new a limit(s) is received, the network node updates the (penalized) link weights with respect to the second link metric $\mu_B$ based on the new limit(s) (step 926) and then the process returns to step 922 and is repeated using the updated link weights. If no new limit(s) is received (e.g., within some predefined amount of time), the process ends.

Notably, in all of the embodiments described herein, the first and second route metrics $\mu_A$ and $\mu_B$ are preferably individual route metrics representing individual route properties (e.g., latency, bit rate, power consumption). However, in some embodiments, the first and/or second route metrics $\mu_A$ and/or $\mu_B$ may be composite (but not necessarily penalized) route metrics where these composite route metrics are composed from, e.g., other more basic monotonic and isotonic metrics. However, in some preferred embodiments, the first and second route metrics $\mu_A$ and $\mu_B$, whether individual or composite route metrics, are monotonic and isotonic, where the composite route metric formed from the first and second route metrics $\mu_A$ and $\mu_B$ may or may not be isotonic.

Figure 14:
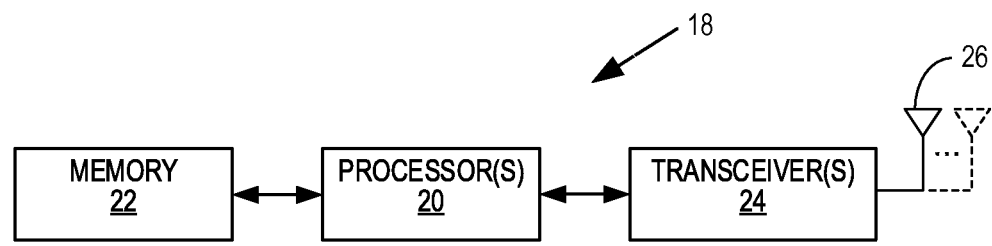
FIG. 14 is a block diagram of a network node according to some embodiments of the present disclosure.

FIG. 14 is a block diagram of a network node 18 according to some embodiments of the present disclosure. The network node 18 may be, e.g., one of the access nodes 12 of FIG. 3, one of the wireless devices 14 of FIG. 3, or the aggregation node 16 of FIG. 3. As illustrated, the network node 18 includes at least one processor 20 (e.g., a Central Processing Unit(s) (CPU(s)), an Application Specific Integrated Circuit(s) (ASIC(s)), a Field-Programmable Gate Array(s) (FPGA(s)), and/or the like), memory 22, and a transceiver 24 coupled to one or more antennas 26. In some embodiments, the functionality of the network node 18 described herein is implemented in software stored in the memory 22 and executed by the processor(s) 20.

In some embodiments, a computer program including instructions which, when executed by at least one processor, causes the at least one processor to carry out the functionality of the network node according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 22).

Figure 15:
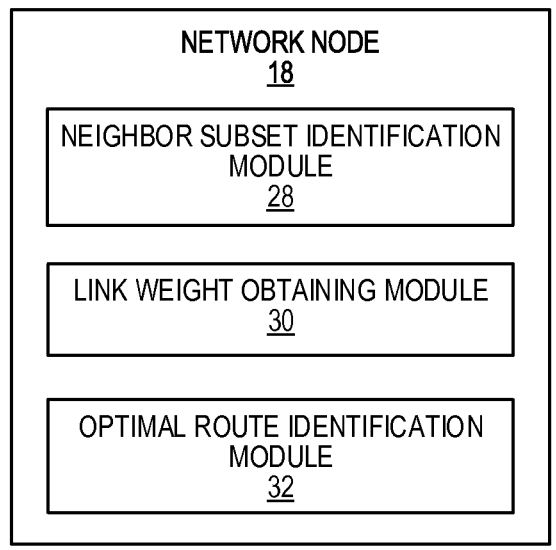
FIG. 15 is a block diagram of a network node according to some other embodiments of the present disclosure.

FIG. 15 is a block diagram of the network node 18 according to other embodiments of the present disclosure. As illustrated, the network node 18 includes a neighbor subset identification module 28, a link weight obtaining module 30, and an optimal route identification module 32, each of which is implemented in software. The neighbor subset identification module 28 operates to identify the subset of the neighbors of the network node 18 that satisfy the limit on the first route metric and, in some embodiments, one or more additional route metrics. The link weight obtaining module 30 obtains the link weights for the links with at least some of the neighbors of the network node 18. The optimal route identification module 32 operates to identify the optimal next hop neighbor of the network node 18 from the subset of the neighbors identified by the neighbor subset identification module 28 based on the second route metric or, alternatively, the composite route metric.

The following acronyms are used throughout this disclosure.
- AN Access Node
- ASIC Application Specific Integrated Circuit
- CPU Central Processing Unit
- FPGA Field-Programmable Gate Array
- NN Network Node
- NP-hard Non-Deterministic Polynomial-Time hard
- UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a wireless network to provide distributed multi-hop route determination, comprising:
   identifying, by the network node, a subset of a plurality of neighbors of the network node in the wireless network based on: (a) first link weights for links from the network node to at least some of the plurality of neighbors of the network node with respect to one or more route metrics for a multi-hop route through the wireless network and (b) one or more defined limits for the one or more route metrics;
   obtaining, by the network node, second link weights for the links from the network node to at least the subset of the plurality of neighbors with respect to a second route metric for a multi-hop route through the wireless network; and
   identifying, by the network node, from the subset of the plurality of neighbors, an optimal next hop neighbor node for the network node in a multi-hop route through the wireless network based on the second link weights for the links from the network node to at least the subset of the plurality of neighbors with respect to the second route metric, wherein identifying the optimal next hop neighbor node comprises:

penalizing the second link weights of ones of the plurality of neighbors of the network node that are not in the subset of the plurality of neighbors of the network node in accordance with a penalty function that penalizes the second route metric if the one or more route metrics do not satisfy the one or more defined limits for the one or more route metrics; and after penalizing the second link weights of the ones of the plurality of neighbors of the network node that are not in the subset of the plurality of neighbors of the network node, identifying one of the plurality of neighbors of the network node as the optimal next hop neighbor node based on the second link weights.

2. The method of claim 1 wherein:

identifying the subset of the plurality of neighbors comprises, based on the link weights for the links from the network node to at least some of the plurality of neighbors of the network node with respect to the one or more route metrics, removing one or more of the plurality of neighbors of the network node that do not satisfy the one or more defined limits for the one or more route metrics from a neighbor list of the network node to provide a trimmed neighbor list of the network node for consideration with respect to the second route metric such that the ones of the plurality of neighbors in the trimmed neighbor list form the subset of the plurality of neighbors of the network node; and identifying the optimal next hop neighbor node comprises identifying one of the subset of the plurality of neighbors of the network node in the trimmed neighbor list as the optimal next hop neighbor node based on the second link weights for the links from the network node to the subset of the plurality of neighbors.

3. The method of claim 1 wherein the one or more route metrics consist of a first route metric, $\mu_A$, such that identifying the subset of the plurality of neighbors comprises:

obtaining, for each neighbor of the plurality of neighbors of the network node, a link weight for the link from the network node to the neighbor with respect to the first route metric, $\mu_A$; and identifying the subset of the plurality of neighbors that satisfy a defined limit for the first route metric, $\mu_A$, based on the link weights for the links from the network node to the plurality of neighbors of the network node.

4. The method of claim 3 further comprising:

identifying a second subset of the plurality of neighbors that satisfy a defined limit for the second route metric, $\mu_B$, based on the second link weights for the links from the network node to the plurality of neighbors of the network node; and identifying, by the network node, from the second subset of the plurality of neighbors, a second optimal next hop neighbor for the network node in a multi-hop route through the wireless network based on the first link weights for the links from the network node to at least the subset of the plurality of neighbors with respect to the first route metric, $\mu_A$.

5. The method of claim 3 wherein the second route metric is an individual route metric, $\mu_B$.

6. The method of claim 5 wherein a composite route metric of the first route metric, $\mu_A$, and the second route metric, $\mu_B$, is non-isotonic.

7. The method of claim 6 wherein the first route metric, $\mu_A$, and the second route metric, $\mu_B$, are both monotonic and isotonic.

8. The method of claim 1 wherein identifying the optimal next hop neighbor node for the network node comprises identifying one of the plurality of neighbors of the network node as the optimal next hop neighbor node for the network node based on a composite route metric, $\mu_{composite}$, that is a function of a first route metric, $\mu_A$ and the second route metric, $\mu_B$, and a penalty function that penalizes the second route metric, $\mu_B$, if the first route metric, $\mu_A$, does not satisfy the defined limit on the first route metric, $\mu_A$.

9. The method of claim 8 wherein the composite route metric, $\mu_{composite}$, is non-isotonic.

10. The method of claim 1 wherein the first route metric, $\mu_A$, is one of a maximum or minimum metric and the second route metric, $\mu_B$, is an additive metric.

11. The method of claim 1 wherein the one or more route metrics comprise a first route metric, $\mu_A$, and an additional route metric such that identifying the subset of the plurality of neighbors comprises:

obtaining, for each neighbor of the plurality of neighbors of the network node, a first link weight for the link from the network node to the neighbor with respect to the first route metric, $\mu_A$;

identifying a first subset of the plurality of neighbors that satisfy a defined limit for the first route metric, $\mu_A$, based on the first link weights for the links from the network node to the plurality of neighbors of the network node;

obtaining, for each neighbor of the network node in at least the first subset of the plurality of neighbors of the network node, an additional link weight for the link from the network node to the neighbor with respect to the additional route metric; and identifying, from the first subset of the plurality of neighbors, a second subset of the plurality of neighbors that satisfy a defined limit for the additional route metric based on the additional link weights for the links from the network node to at least the first subset of the plurality of neighbors of the network node.

12. The method of claim 1 further comprising:

receiving, by the network node, an updated limit for at least one of the one or more route metrics;

identifying, by the network node, a new subset of the plurality of neighbors of the network node based on the updated limit for the at least one of the one or more route metrics; and identifying, by the network node, from the new subset of the plurality of neighbors of the network node, a new optimal next hop neighbor for the network node in a multi-hop route through the wireless network with respect to the second route metric, $\mu_B$.

13. The method of claim 1 further comprising receiving, by the network node, the one or more defined limits for the one or more route metrics.

14. The method of claim 13 further comprising providing the one or more defined limits for the one or more route metrics to at least one of the plurality of neighbors of the network node in the wireless network.

15. The method of claim 13 further comprising providing the one or more defined limits for the one or more route metrics to each of the plurality of neighbors of the network node in the wireless network.

16. A network node in a wireless network enabled to provide distributed multi-hop route determination, comprising:

a wireless transceiver;
at least one processor; and
memory containing software executable by the at least one processor whereby the network node is operative to:
identify a subset of a plurality of neighbors of the network node in the wireless network based on: (a) link weights for links from the network node to at least some of the plurality of neighbors of the network node with respect to one or more route metrics for a multi-hop route through the wireless network and (b) one or more defined limits for the one or more route metrics;
obtain second link weights for the links from the network node to at least the subset of the plurality of neighbors with respect to a second route metric for a multi-hop route through the wireless network; and
identify, from the subset of the plurality of neighbors, an optimal next hop neighbor node for the network node in a multi-hop route through the wireless network based on the second link weights for the links from the network node to at least the subset of the plurality of neighbors with respect to the second route metric, wherein, when identifying the optimal next hop neighbor node, the network node is further operative to:
penalize the second link weights of ones of the plurality of neighbors of the network node that are not in the subset of the plurality of neighbors of the network node in accordance with a penalty function that penalizes the second route metric if the one or more route metrics do not satisfy the one or more defined limits for the one or more route metrics; and
after penalizing the second link weights of the ones of the plurality of neighbors of the network node that are not in the subset of the plurality of neighbors of the network node, identify one of the plurality of neighbors of the network node as the optimal next hop neighbor node based on the second link weights.

17. A method of operation of a wireless network to provide distributed multi-hop route determination, comprising:
finding, by the wireless network in a distributed manner, a route from a source node to a destination node through the wireless network according to a first route metric, $\mu_A$;
establishing, by the source node, a limit on the first route metric, $\mu_A$, for the route based on a weight assigned to the route from the source node to the destination node for the first route metric, $\mu_A$;
providing the limit on the first route metric, $\mu_A$, from the source node to at least some of a plurality of network nodes in the wireless network;
trimming, by each network node in at least some of the plurality of network nodes, links with neighbor nodes for which the limit on the first route metric, $\mu_A$, is not satisfied from consideration for an optimal route from the source node to the destination node according to a second route metric, $\mu_B$, to thereby provide a trimmed network;
determining whether a weight of the optimal route for the second route metric, $\mu_B$, is better than a predefined acceptable level; and if the weight of the optimal route for the second route metric, $\mu_B$, is not better than the predefined acceptable level,
updating the limit on the first route metric, $\mu_A$, thereby establishing a new limit for the route that is less restrictive than the limit on the first route metric, $\mu_A$;
providing the new limit on the first route metric, $\mu_A$, from the source node to at least some of the plurality of network nodes in the wireless network;
removing, by each network node of at least some of the plurality of network nodes, all links with neighbor nodes for which the new limit in the first route metric, $\mu_A$, is not satisfied from consideration for a new optimal route from the source node to the destination node according to the second route metric, $\mu_B$, to thereby provide a new trimmed network; and
finding, by the wireless network in a distributed manner, an optimal route from the source node to the destination node through the new trimmed network according to the second route metric, $\mu_B$.

18. The method of claim 17 wherein trimming the links with the neighbor nodes for which the limit on the first route metric, $\mu_A$, is not satisfied comprises removing the links with the neighbor nodes for which the limit on the first route metric, $\mu_A$, is not satisfied from consideration for the optimal route from the source node to the destination node according to the second route metric, $\mu_B$.

19. The method of claim 17 wherein trimming the links with the neighbor nodes for which the limit on the first route metric, $\mu_A$, is not satisfied comprises penalizing, with respect to the second route metric, $\mu_B$, the links with the neighbor nodes for which the limit on the first route metric, $\mu_A$, is not satisfied such that the links with the neighbor nodes for which the limit on the first route metric, $\mu_A$, is not satisfied are effectively removed from consideration for the optimal route from the source node to the destination node according to the second route metric, $\mu_B$.

20. The method of claim 17 wherein finding the route from the source node to the destination node through the wireless network according to the first route metric, $\mu_A$, comprises finding an optimal route from the source node to the destination node through the wireless network according to the first route metric, $\mu_A$.

21. The method of claim 17 wherein finding the route from the source node to the destination node through the wireless network according to the first route metric, $\mu_A$, comprises finding a route from the source node to the destination node through the wireless network having a weight for the first route metric, $\mu_A$, that is better than a predefined threshold.

22. The method of claim 17 further comprising:
finding, by the wireless network in a distributed manner, a route from the source node to the destination node through the wireless network according to the second route metric, $\mu_B$;
establishing, by the source node, a limit on the second route metric, $\mu_B$, for the route based on a weight assigned to the route from the source node to the destination node for the second route metric, $\mu_B$;
providing the limit on the second route metric, $\mu_B$, from the source node to at least some of the plurality of network nodes in the wireless network;
removing, by each network node of at least some of the plurality of network nodes, all links with neighbor nodes for which the limit on the second route metric, $\mu_B$, is not satisfied from consideration for an optimal route from the source node to the destination node according to the first route metric, $\mu_A$, to thereby provide a second trimmed network;

finding, by the wireless network in a distributed manner, an optimal route from the source node to the destination node through the second trimmed network according to the first route metric, $\mu_A$; and selecting one of the optimal route from the source node to the destination node through the trimmed network according to the second route metric, $\mu_B$, and the optimal route from the source node to the destination node through the second trimmed network according to the first route metric, $\mu_A$, as a best optimal route.

* * * * *